(12) United States Patent
Wang et al.

(10) Patent No.: US 12,730,780 B2
(45) Date of Patent: Sep. 8, 2026

(54) METHOD, APPARATUS, TERMINAL AND STORAGE MEDIUM FOR INFORMATION PROCESSING

(71) Applicant: Beijing Zitiao Network Technology Co., Ltd., Beijing (CN)

(72) Inventors: Changming Wang, Beijing (CN); Fan Yang, Beijing (CN); Linna Zhang, Beijing (CN); Bingxi Lin, Beijing (CN); Changyu Guo, Beijing (CN); Fang Liu, Beijing (CN); Zisheng Liu, Beijing (CN); Tian Lan, Beijing (CN); Fabin Liu, Beijing (CN); Zhengzhe Zhang, Beijing (CN); Siyu Hou, Beijing (CN); Yao Wang, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/397,277

(22) Filed: Dec. 27, 2023

(65) Prior Publication Data

US 2024/0127182 A1 Apr. 18, 2024

Related U.S. Application Data

(63) Continuation of application No. PCT/CN2022/113095, filed on Aug. 17, 2022.

(30) Foreign Application Priority Data

Aug. 18, 2021 (CN) ......................... 202110950234.2
Sep. 7, 2021 (CN) ......................... 202111046162.5

(51) Int. Cl.
*G06Q 10/06* (2023.01)
*G06F 16/11* (2019.01)
(Continued)

(52) U.S. Cl.
CPC ........ *G06F 16/1827* (2019.01); *G06F 16/113* (2019.01); *G06F 16/13* (2019.01);
(Continued)

(58) Field of Classification Search
CPC ......... G06Q 10/0633; G06Q 10/06316; G06Q 10/10; G06Q 10/06311; G06Q 10/063114; G06F 16/93
See application file for complete search history.

(56) References Cited

U.S. PATENT DOCUMENTS 5,890,163 A 3/1999 Todd
6,070,177 A 5/2000 Kao et al.
(Continued)

FOREIGN PATENT DOCUMENTS

CN 101004804 A 7/2007
CN 101622601 A 1/2010
(Continued)

OTHER PUBLICATIONS

International Search Report and Written Opinion, International Patent Application No. PCT/CN2022/113095, Nov. 17, 2022, with English translation of Search Report (10 pages).
(Continued)

*Primary Examiner* — Wilson W Tsui
(74) *Attorney, Agent, or Firm* — Astute IP Law Group

(57) ABSTRACT

This disclosure provides a method and apparatus, terminal and storage medium for information processing. The method of information processing includes: receiving a first document for processing a business flow, the business flow comprising one or more business nodes; and when a predetermined operation is performed on a content of the first document, determining an associated person associated with
(Continued)

at least one business node of the business flow based on the predetermined operation, and sending a notification message to the associated person.

23 Claims, 13 Drawing Sheets

(51) Int. Cl.

| | |
|---|---|
| ***G06F 16/13*** | (2019.01) |
| ***G06F 16/182*** | (2019.01) |
| ***G06F 16/93*** | (2019.01) |
| ***G06F 16/955*** | (2019.01) |
| ***G06F 21/60*** | (2013.01) |
| ***G06F 21/62*** | (2013.01) |
| ***G06F 40/106*** | (2020.01) |
| ***G06F 40/123*** | (2020.01) |
| ***G06Q 10/10*** | (2023.01) |
| ***H04L 67/06*** | (2022.01) |

(52) U.S. Cl.

CPC ............ *G06F 16/183* (2019.01); *G06F 16/93* (2019.01); *G06F 16/9558* (2019.01); *G06F 21/604* (2013.01); *G06F 21/6209* (2013.01); *G06F 40/106* (2020.01); *G06F 40/123* (2020.01); *G06Q 10/10* (2013.01); *H04L 67/06* (2013.01); *G06F 2221/2141* (2013.01)

(56) References Cited

U.S. PATENT DOCUMENTS 6,370,552 B1 4/2002 Bloomfield
6,678,705 B1 1/2004 Berchtold et al.
7,065,493 B1* 6/2006 Homsi ............. G06Q 10/06316 705/7.26
7,391,423 B1 6/2008 Manzari et al.
8,122,364 B2 2/2012 Yozell-Epstein et al.
8,266,544 B1 9/2012 Kay et al.
8,682,989 B2 3/2014 Meisels et al.
8,805,741 B2 8/2014 Laverdiere-Papineau et al.
8,893,036 B1 11/2014 Wabyick
10,552,796 B1* 2/2020 Delacourt ............ G06Q 10/103
11,216,172 B1 1/2022 Hart et al.
2001/0011364 A1 8/2001 Stoub
2001/0034843 A1 10/2001 Hess
2003/0028404 A1* 2/2003 Herron ................... G06Q 40/08 705/4
2003/0061266 A1* 3/2003 Ouchi ................ G06Q 10/0633 719/313
2004/0148214 A1 7/2004 Aziz et al.
2004/0243925 A1 12/2004 Yates et al.
2005/0097061 A1* 5/2005 Shapiro ................. H04L 9/0891 705/67
2005/0228836 A1 10/2005 Bacastow et al.
2006/0010025 A1 1/2006 Sattler et al.
2006/0069605 A1* 3/2006 Hatoun .............. G06Q 10/0633 705/7.26
2006/0074714 A1 4/2006 Aziz et al.
2006/0085452 A1 4/2006 Cope
2006/0149725 A1 7/2006 Ritter
2006/0288222 A1 12/2006 Dunkley
2007/0088958 A1 4/2007 Qa'Im-maqami
2007/0192275 A1 8/2007 Foygel et al.
2008/0046518 A1 2/2008 Tonnison et al.
2009/0006936 A1 1/2009 Parker et al.
2009/0006949 A1 1/2009 Takeuchi
2009/0260060 A1 10/2009 Smith et al.
2009/0300471 A1* 12/2009 Dettinger ................ G06F 16/80 715/200
2011/0145037 A1* 6/2011 Domashchenko ..... G06Q 10/06 705/7.27
2012/0060162 A1* 3/2012 Hunt ...................... G06Q 10/06 718/102
2012/0110087 A1* 5/2012 Culver .................... G06F 30/13 709/205
2013/0201534 A1 8/2013 Carlen et al.
2013/0283145 A1 10/2013 Argent
2014/0033118 A1 1/2014 Baird
2014/0201131 A1* 7/2014 Burman .................. G06F 40/10 707/608
2015/0100503 A1 4/2015 Lobo et al.
2015/0199307 A1 7/2015 Zhang et al.
2015/0229648 A1* 8/2015 Avery ................... H04L 63/101 726/30
2015/0281149 A1 10/2015 Masterson et al.
2016/0026676 A1 1/2016 Qi et al.
2016/0117303 A1 4/2016 Topness et al.
2016/0127609 A1 5/2016 Moritani et al.
2017/0076101 A1* 3/2017 Kochhar ............. G06F 21/6209
2017/0131944 A1 5/2017 Bruckner et al.
2017/0220546 A1 8/2017 Codrington et al.
2017/0257406 A1 9/2017 Wilde et al.
2018/0246734 A1 8/2018 Shao et al.
2018/0300304 A1 10/2018 Mullins et al.
2019/0087763 A1* 3/2019 Stone .................... G06F 9/4843
2020/0019715 A1 1/2020 Malliah et al.
2020/0210383 A1 7/2020 DeMaris et al.
2020/0380171 A1 12/2020 Bonat et al.
2021/0064262 A1 3/2021 Myers et al.
2022/0138161 A1 5/2022 Anjum et al.
2022/0138690 A1 5/2022 Anjum et al.
2022/0405409 A1 12/2022 Cheng-Shorland et al.
2022/0414326 A1 12/2022 Li et al.

FOREIGN PATENT DOCUMENTS

CN 102831505 A 12/2012
CN 103218121 A 7/2013
CN 103246595 A 8/2013
CN 103294794 A 9/2013
CN 104571804 A 4/2015
CN 106202568 A 12/2016
CN 107122171 A 9/2017
CN 107886306 A 4/2018
CN 109299037 A 2/2019
CN 109325158 A 2/2019
CN 109408112 A 3/2019
CN 109510754 A 3/2019
CN 110162758 A 8/2019
CN 110221904 A 9/2019
CN 110262965 A 9/2019
CN 110413971 A 11/2019
CN 110752984 A 2/2020
CN 111045999 A 4/2020
CN 111212300 A 5/2020
CN 112035861 A 12/2020
CN 112036824 A 12/2020
CN 112114734 A 12/2020
CN 112183045 A 1/2021
CN 112184158 A 1/2021
CN 112330299 A 2/2021
CN 112367403 A 2/2021
CN 112506854 A 3/2021
CN 112632942 A 4/2021
CN 112668297 A 4/2021
CN 112685091 A 4/2021
CN 112866095 A 5/2021
CN 113128185 A 7/2021
CN 113191517 A 7/2021
CN 114331331 A 4/2022
FR 2980288 A1 3/2013
JP 2012-059086 A 3/2012
JP 2017-182329 A 10/2017
TW 201109983 A 3/2011

OTHER PUBLICATIONS

Bellotti et al., "Taking Email to Task: The Design and Evaluation of a Task Management Centered Email Tool", published: 2003, publisher: CHI 2003, pp. 345-352 (Year: 2003).

(56) References Cited

OTHER PUBLICATIONS

ErikJamp, "Shade Windows in OpenTTD", published: 2009, publisher: TT-Forums.net, pp. 1-6 (Year: 2009).
Gazze et al., "Workmail: Colaborative Document Workflow Management by Email", publisher: Springer-Verlag Berlin Heidelberg, published: 2012, pp. 14-23 (Year: 2012).
Chumakova "How to Transform you Outlook into a Workflow System", published: Jan. 2015, publisher: cmwlab.com, pp. 1-4 (Year: 2015).
Office Action issued in U.S. Appl. No. 18/396,647, Feb. 29, 2024 (40 pages).
Office Action issued in U.S. Appl. No. 18/397,926, Mar. 28, 2024 (37 pages).
Office Action issued in U.S. Appl. No. 18/539,616, Mar. 15, 2024 (42 pages).
International Search Report, International Patent Application No. PCT/CN2022/113091, Nov. 18, 2022, with English translation (5 pages).
International Search Report, International Patent Application No. PCT/CN2022/113092, Nov. 17, 2022, with English translation (7 pages).
Yang et al., "Flexible Use of Microsoft Word", Computer Application, No. 3, Mar. 31, 2006, p. 105, with machine translation.
"How to upload wps cloud documents to private space", available online at https://jingyan.baidu.com/article/fb48e8be0dea676e622e1407.html, Jul. 28, 2016, pp. 1-4, with machine translation.
International Search Report, International Patent Application No. PCT/CN2022/113093, Nov. 18, 2022, with English translation (8 pages).
International Search Report, International Patent Application No. PCT/CN2022/113097, Oct. 25, 2022, with English translation (5 pages).
Office Action issued in U.S. Appl. No. 18/397,951, Apr. 29, 2024 (44 pages).
Advisory Action for U.S. Appl. No. 18/396,647, mailed on Oct. 11, 2024, 4 pages.
Non-Final Office Action for U.S. Appl. No. 18/396,647, mailed on Oct. 24, 2024, 25 pages.
Non-Final Office Action for U.S. Appl. No. 18/539,616, mailed on Oct. 24, 2024, 24 pages.
Final Office Action issued in U.S. Appl. No. 18/396,647, Jul. 10, 2024 (28 pages).
Resizing a Div to Fit with Maximum Height, published: May 1, 2012, published: StackOverflow, p. 1 (Year: 2012).
Final Office Action issued in U.S. Appl. No. 18/539,616, Jul. 26, 2024 (25 pages).
Final Office Action issued in U.S. Appl. No. 18/397,926, Aug. 22, 2024 (24 pages).
Extended European Search Report, European Patent Application No. 22857861.3, Aug. 12, 2024 (9 pages).
Office Action for Japanese Patent Application No. 2023-580867, mailed on Dec. 17, 2024, 8 pages.
Non-Final Office Action for U.S. Appl. No. 18/397,926, mailed on Dec. 17, 2024, 26 pages.
Non-Final Office Action for U.S. Appl. No. 18/397,951, mailed on Jan. 10, 2025, 57 Pages.
Final Office Action for U.S. Appl. No. 18/396,647, mailed on Mar. 27, 2025, 27 pages.
Final Office Action for U.S. Appl. No. 18/397,926, mailed on Jun. 11, 2025, 30 pages.
Final Office Action for U.S. Appl. No. 18/397,951, mailed on May 9, 2025, 63 pages.
Final Office Action for U.S. Appl. No. 18/539,616, mailed on May 29, 2025, 28 pages.
Non-Final Office Action for U.S. Appl. No. 18/396,647, mailed on Jul. 30, 2025, 29 pages.
Non-Final Office Action for U.S. Appl. No. 18/397,951, mailed on Sep. 30, 2025, 38 pages.
Final Office Action for U.S. Appl. No. 18/397,951, mailed on Feb. 19, 2026, 48 pages.
Office Action for Chinese Patent Application No. 202111046162.5, mailed on Feb. 12, 2026, 27 pages.
Office Action for Chinese Patent Application No. 202111046163.X, mailed on Feb. 14, 2026, 12 pages.
Office Action for Chinese Patent Application No. 202111046169.7, mailed on Dec. 4, 2025, 18 pages.
Office Action for Chinese Patent Application No. 202111046201.1, mailed on Dec. 10, 2025, 17 pages.
Office Action for Chinese Patent Application No. 202111046202.6, mailed on Mar. 31, 2026, 21 pages.
Niu, Shaozhang, "Information Security Conspectus", Beijing University of Posts and Telecommunications Press, Apr. 30, 2004, 5 pages.
Office Action for Chinese Patent Application No. 202111046162.5, mailed on Jul. 2, 2026, 28 pages.
Tang et al., "Collection of Papers on Land Resources Monitoring and Survey Engineering, National Land Resources Survey II", Geological Publishing House, Beijing, Sep. 30, 2004, 5 pages.

* cited by examiner

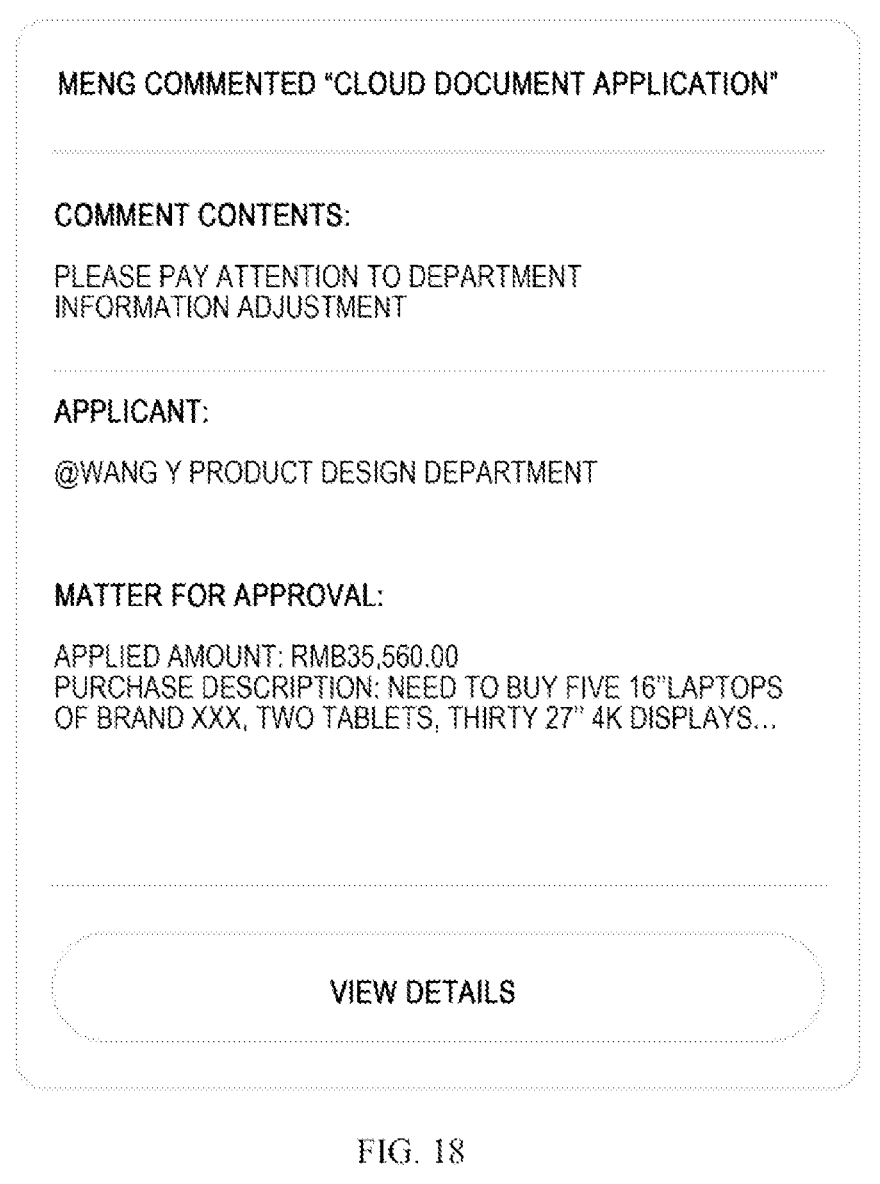

MENG COMMENTED "CLOUD DOCUMENT APPLICATION"

COMMENT CONTENTS:

PLEASE PAY ATTENTION TO DEPARTMENT INFORMATION ADJUSTMENT

APPLICANT:

@WANG Y PRODUCT DESIGN DEPARTMENT

MATTER FOR APPROVAL:

APPLIED AMOUNT: RMB35,560.00
PURCHASE DESCRIPTION: NEED TO BUY FIVE 16"LAPTOPS OF BRAND XXX, TWO TABLETS, THIRTY 27" 4K DISPLAYS...

VIEW DETAILS

FIG. 18

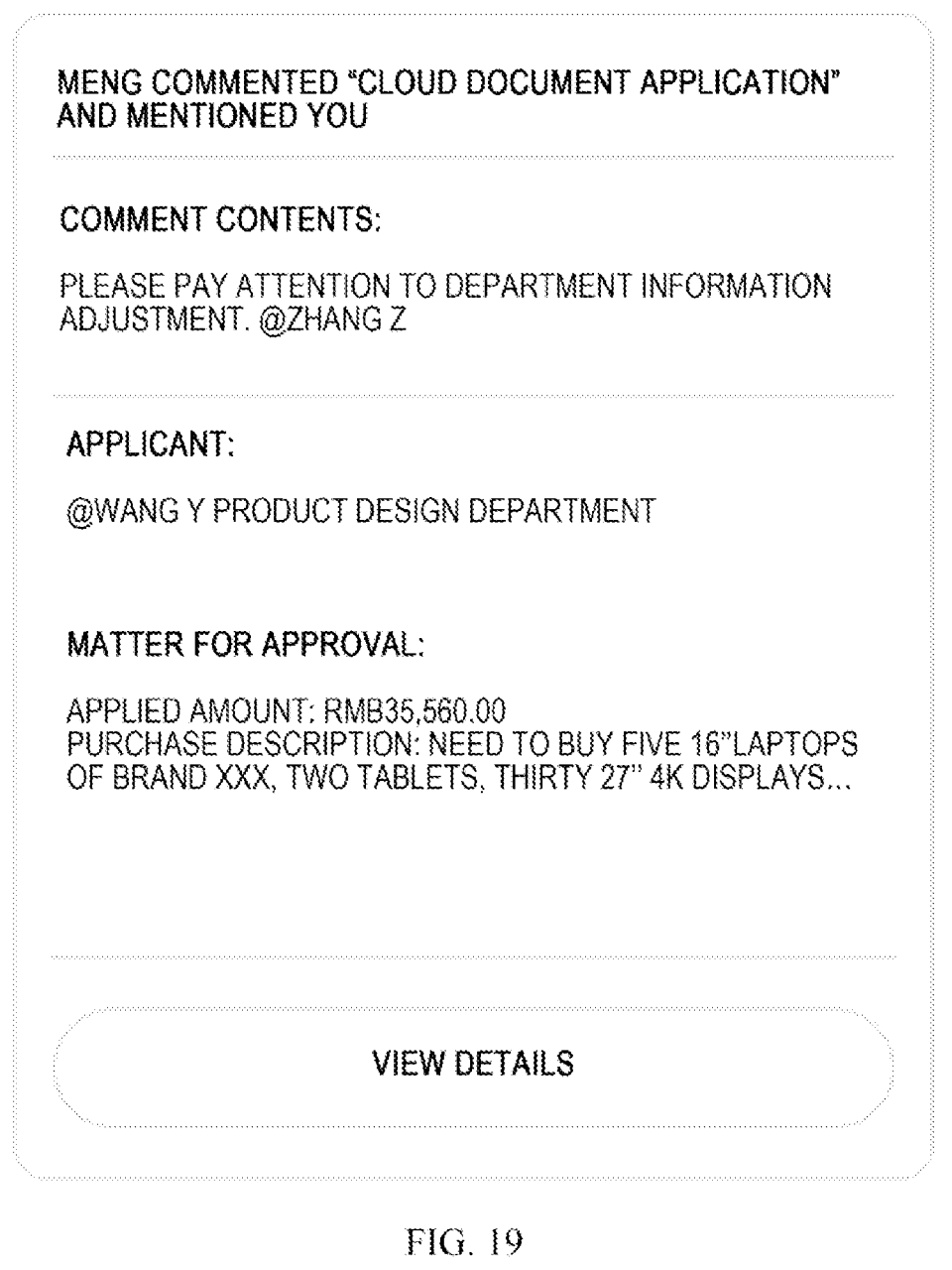

MENG COMMENTED “CLOUD DOCUMENT APPLICATION” AND MENTIONED YOU

COMMENT CONTENTS:

PLEASE PAY ATTENTION TO DEPARTMENT INFORMATION ADJUSTMENT. @ZHANG Z

APPLICANT:

@WANG Y PRODUCT DESIGN DEPARTMENT

MATTER FOR APPROVAL:

APPLIED AMOUNT: RMB35,560.00
PURCHASE DESCRIPTION: NEED TO BUY FIVE 16”LAPTOPS OF BRAND XXX, TWO TABLETS, THIRTY 27” 4K DISPLAYS...

VIEW DETAILS

FIG. 19

METHOD, APPARATUS, TERMINAL AND STORAGE MEDIUM FOR INFORMATION PROCESSING

CROSS REFERENCE

This application is a continuation of International Patent Application No. PCT/CN2022/113095, filed on Aug. 17, 2022, which claims priorities to Chinese Patent Application No. 202110950234.2 which is filed on Aug. 18, 2021 and entitled "Method, Apparatus, Terminal and Storage Medium For Information Processing", and to Chinese Patent Application No. 202111046162.5 which is filed on Sep. 7, 2021 and entitled "Method, Apparatus, Terminal and Storage Medium For Information Processing", the entireties of which are incorporated herein by reference.

FIELD

The present disclosure relates to the technology field of information, and more particularly, to a method, apparatus, terminal, and storage medium for information processing.

BACKGROUND

In some document processing scenarios (such as enterprise approval scenarios), types of approval such as official documents, systems, qualification review, and contracts often rely on different information or document content as decision-making basis. The approval flow involves multi-party communication and collaboration. How to improve the efficiency of information processing in these scenarios is a problem that needs to be solved.

SUMMARY

To solve the existing problems, the present disclosure provides a method, apparatus, a terminal, and a storage medium for information processing.

This disclosure adopts the following technical solution.

The embodiment of the present disclosure provides a method of information processing, the method of information processing includes: receiving a first document for processing a business flow, the business flow including one or more business nodes; and when a predetermined operation is performed on a content of the first document, determining an associated person associated with at least one business node of the business flow based on the predetermined operation, and sending a notification message to the associated person.

Another embodiment of the present disclosure provides an apparatus for information processing, the apparatus for information processing includes: a document receiving module configured to receive a first document for processing a business flow, the business flow including one or more business nodes; a message sending module configured to determine, when a predetermined operation is performed on a content of the first document, an associated person associated with at least one business node of the business flow based on the predetermined operation, and sending a notification message to the associated person.

In some embodiments, the present disclosure provides a terminal, including: at least one memory and at least one processor; where the memory is configured to store program code, the processor is configured to call the program code stored in the at least one memory to perform the method of information processing.

In some embodiments, the present disclosure provides a storage medium for storing program code, the program code is configured to perform the method of information processing.

BRIEF DESCRIPTION OF THE DRAWINGS

In conjunction with the accompanying drawings and with reference to the following embodiments, the above and other features, advantages and aspects of the various embodiments of the present disclosure will become more apparent. Throughout the drawings, the same or similar reference numerals indicate the same or similar elements. It should be understood that the drawings are illustrative, and the originals and elements are not necessarily drawn to scale.

FIG. 18 and FIG. 19 show a schematic diagram of a notification message according to some embodiments of the present disclosure.

DETAILED DESCRIPTION

Figure 1:
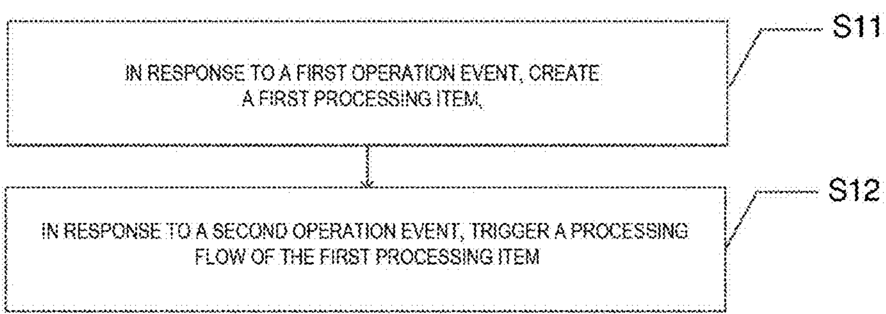
FIG. 1 is a flowchart of an information processing method according to embodiments of the present disclosure.

The following will describe the embodiments of the present disclosure in more detail with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are provided for illustrative purposes only and are not intended to limit the scope of protection of the present disclosure.

It should be understood that the various steps described in the method implementation of this disclosure can be executed in different orders and/or in parallel. In addition, the method implementation can include additional steps and/or the steps as shown may be omitted. The scope of this disclosure is not limited in this regard.

The term "including" and its variations as used herein are non-exclusive inclusion, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different apparatuses, modules, or units, but are not used to limit the order or interdependence of the functions performed by these apparatuses, modules, or units.

It should be noted that the modifications of "one" and "a plurality of" mentioned in this disclosure are illustrative but not limiting. Those skilled in the art should understand that unless otherwise indicated in the context, they should be understood as "one or more".

The names of the messages or information interacted between multiple apparatuses in this public implementation are for illustrative purposes only, which are not intended to limit the scope of these messages or information.

The following will describe in detail the technical solution provided by the present disclosure in conjunction with the accompanying drawings.

The present disclosure provides a method of information processing, including:

- determining a first application, the first application is associated with a first business logic, and the first application processes business data of the first application according to the first business logic.
- establishing an association relationship between the first application and a first online document;
- performing first processing on business data of the first online document according to information related to a business processing node of the first application.

By processing data of the first online document according to the information related to the business processing node of the first application, the data processing for the first online document may adapt to the business logic of the first application itself, so that the data carried by the online document can reflect or adapt to the business logic, so that on the one hand, when using the first application for business processing, convenience can be obtained by utilizing the online collaboration of the online document, and the business logic can be prevented from being destroyed due to open of the online document collaboration, thereby improving the reliability of the business.

In some embodiments, the first application may have a variety of presentation forms, such as standalone applications, or mini-programs and sub-programs embedded in other programs or sub-programs based on other programs, and the like.

The establishing an association relationship between the first application and a first online document may include linking or displaying the first online document in a processing interface of the first application.

In some embodiments, the information associated with the business processing node includes at least one of the following: a business node, person information associated with the business node, and business data associated with the business node;

The performing first processing on business data of the first online document according to information related to a business processing node of the first application includes one or more of the following:

- according to a current business processing node, processing display information, permission information of the first online document, and content data carried in the first online document;
- according to person information associated with the business node, processing displayable content, display format, and permission information for the first online document for the person;
- according to business data associated with the business node, generating the first online document or processing the content data carried in the first online document.

In some embodiments, the first application may be an approval program, the information related to the business processing node includes one or more approval nodes, the person associated with the approval node, such as an approver, a carbon copied recipient, submitter (a person who submits the approval request) and so on.

In some embodiments, the first application may be a reporting program, the information related to the business processing node includes one or more reporting nodes, the person associated the reporting node, such as an object to be reported, a carbon copied recipient of the reporting and the like.

Within an enterprise, sometimes it is necessary to approve item content, work content, product qualifications, and rules and regulations. Usually, the processing flow is triggered first, and then an approval task is created. The approval task usually needs to be approved by a plurality of persons in charge.

Taking the approval program as an example, the technical solution of the present disclosure is introduced illustratively: within the enterprise, sometimes it is necessary to approve some items, such as approval on documents, systems, qualifications, contracts, etc. During the approval flow, sometimes it is necessary to consult relevant documents as a reference.

FIG. 1 is a flowchart of a method of information processing of an embodiment of the present disclosure, and the method includes the following steps.

S11: in response to a first operation event, creating a first processing item, the first processing item having a first online document therein.

In some embodiments, the method of information processing can be used to a first application such as an approval program, and it may include creating a first processing item (the first processing item can be business data) in the first application. For example, the first operation event may include one or more operations, such as a processing item creating operation, which can be a first operation event executed by the creator of the first processing item. The first processing item can be an official document approval, leave approval, regulation approval, decision approval, etc. The first processing item has a first online document (also called a cloud document) therein. The first online document can be stored in a cloud space, for example, it can be stored in a server. The first processing item can be displayed in the form of a task item, a document display area can be inserted in the first processing item, and the first processing item is displayed in the document display area.

S12: in response to a second operation event, triggering a processing flow of the first processing item.

In some embodiments, the second operation event may include one or more operation steps, the second operation event may be, for example, an event to submit a processing item, after triggering the second operation event, the processing flow of the first processing item (business processing flow) may be started, and the business processing logic may be started to execute according to the first business logic.

In some embodiments of the present disclosure, a first processing item having a first online document may be created, so that the person performing approval may view the first online document in the processing item, the first online document, for example, may be a document of associated information of the first processing item, so that the person for processing may review the associated information when conducting approval.

In some embodiments of the present disclosure, before creating the first processing item in response to the first operation event, the method further includes: in response to a process creation operation, setting a business processing node of the processing flow and document permissions of the processing person of the business processing node. In some embodiments, the processing flow of the processing item may include one or more business processing nodes therein, and the business processing node may have a corresponding processing person, and document permissions may be set for the business processing node of the first processing item. The document permissions of the processing person may include, for example, a read permission and an edit permission, and the permission of the processing person for the online documents in the processing item is determined based on the document permissions to achieve permission management. In some embodiments, the read permission and edit permission for online document can be set for a business processing node, i.e. setting nodes that can read or edit online documents.

Figure 2:
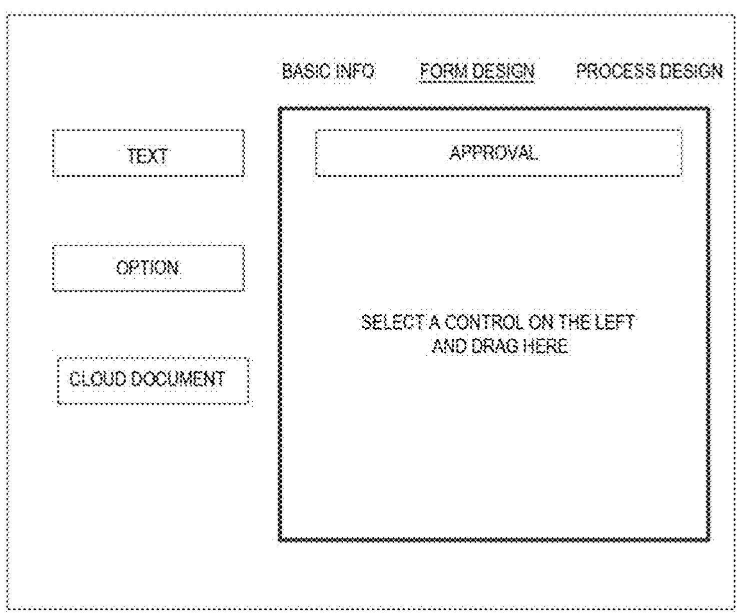
FIG. 2 is a schematic diagram of a service data template according to an embodiment of the present disclosure.
Figure 3:
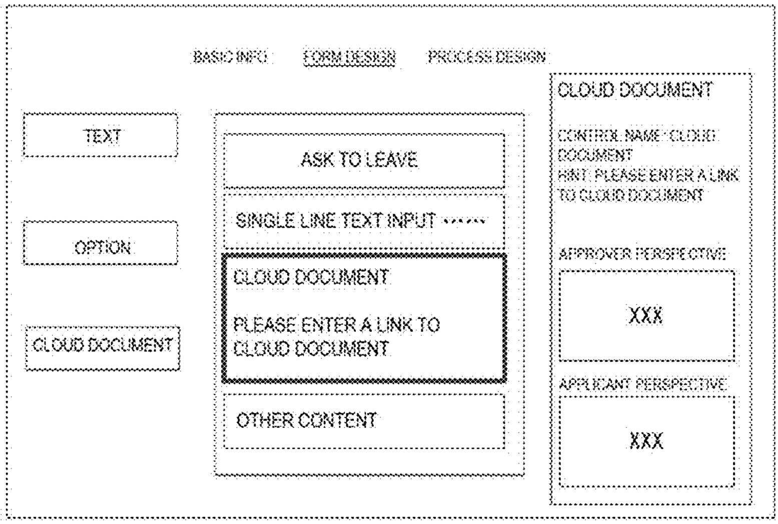
FIG. 3 is a schematic diagram of a service data template according to an embodiment of the present disclosure.

In some embodiments of the present disclosure, before creating the first processing item in response to the first operation event, the method further includes: creating an item template of the processing item, a control for adding online documents is included in the item template; the first processing item is established based on the item template. In some embodiments, the item template of the processing item can be a form module, and the processing item template can be pre-designed for creating a processing item. Please refer to FIG. 2, it schematically shows an item template, and the item template may have a control for adding online documents (cloud documents), for example, a plurality of controls can be provided for selection. Please refer to FIG. 3, where a text control and a cloud document control are added, and the item template of the processing item may be created by the administrator of the approval program. After the item template is created, the creator (applicant) of the first processing item initiates an application and creates the first processing item based on the item template, and adds the first online document through the control for adding online documents. Of course, other controls may also be added to the item template by triggering a control option, and a name of control can be entered after adding other controls. The control for adding online documents has an input box, which is used to display the online document. The input box has default prompt text (such as "Please enter a link to cloud document" in FIG. 3) therein, and the prompt text can be edited. Different languages can be supported for the prompt text. In some embodiments, the first processing item can be output, for example, it can be printed or stored as a specific file. After the first approval document is output, the output content may be displayed with the control included in the first processing item and the content in the control, that is, the name of the control for displaying the online document and the document name of the first online document are output. For example, the name of the control for adding the online document is "cloud document", and the document name of the first online document and the "cloud document" will be output after the first approval document is output. In some embodiments, after creating the item template of the processing item, a preview of the item template can be displayed, for example, previews from perspectives of different user (such as the approver's perspective and the applicant's perspective shown in FIG. 3) can be displayed to view the implementation effect.

Figure 4:
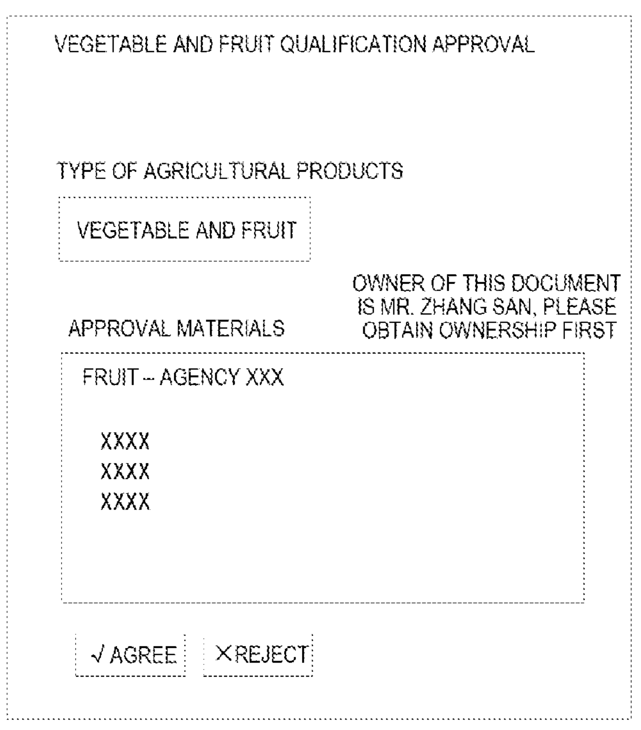
FIG. 4 is a schematic view of display of service data according to an embodiment of the present disclosure.

In some embodiments of the present disclosure, the creating the first processing item in response to the first operation event includes: in response to a trigger operation for a processing item creation control, displaying an item creation interface (the item creation interface may be an item creation template), and displaying a control for adding an online document in the item creation interface; in response to a trigger operation for the control for adding online documents, displaying a document addition interface. In some embodiments, a recommended online document may be displayed in the document addition interface, and a search box may be displayed in the document addition interface. Information such as document title or document address can be entered into the search box to search for an online document. When searching for the online document, the permission of the current user for the online document can be displayed in an association area of the searched online document, and the searched online document can be selected and added. The first online document can be added to a document addition page, and the first online document can be displayed in the document display area of the item creation interface. The associated information of the first operation item can be entered into the item creation interface, and the creation of the first operation item can be completed in response to the trigger operation for a determination control of the document creation interface. In some embodiments, only an owner of the first online document can add the first online document to the first operation item, as shown in FIG. 4. Such owner may be a collaborator with edit permissions/read permissions. If the creator of the first operation item is not the owner of the first online document, a prompt message can be issued when adding the first online document in the first operation item. The owner of the first online document may be displayed in the prompt message, such as displaying the contact method or business card of the owner of the first online document, or a control for contacting the owner of the first online document after being triggered can be displayed in the prompt message, which is convenient to apply for permission from the owner of the first online document.

Figure 5:
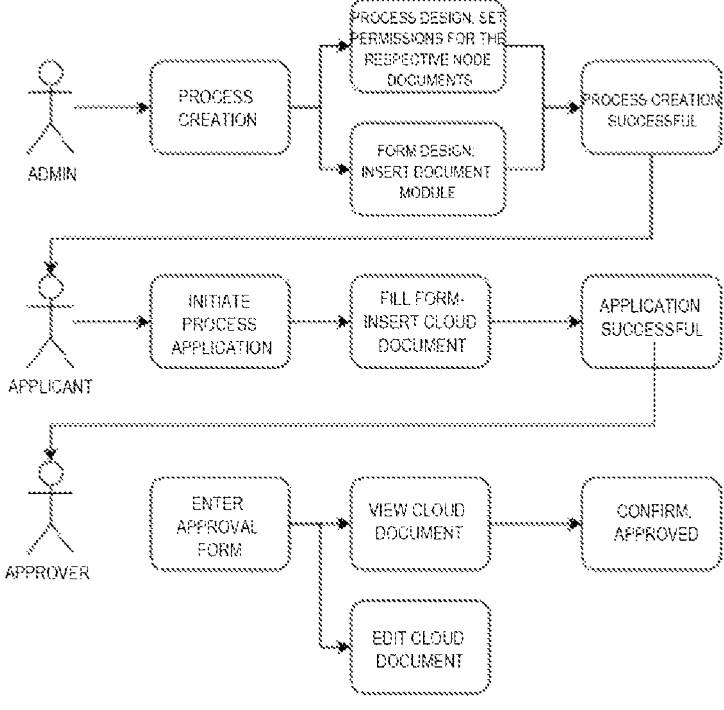
FIG. 5 is a flowchart of an information processing method according to an embodiment of the present disclosure.
Figure 6:
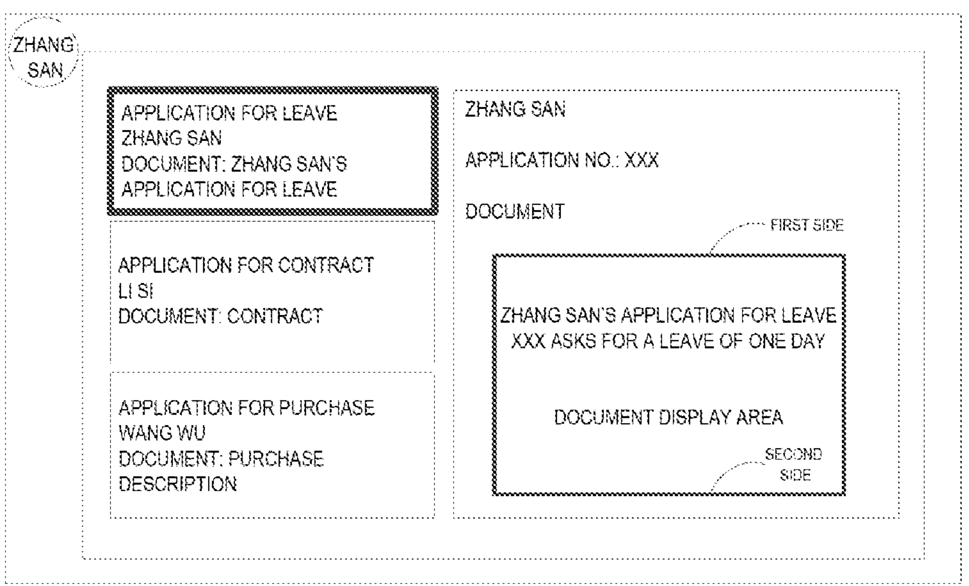
FIG. 6 is a schematic display of a target communication program according to an embodiment of the present disclosure.

In some embodiments, as shown in FIG. 5, the process is created by an administrator of the first application, and then the process design is performed to set the document permissions of each node, and the form design is performed to insert the document module (a control for adding online documents). After the processing flow is successfully created, the applicant initiates the process application and fills in and adds online documents on the basis of the item template, and after the application is successful, the person associated with the business processing node (such as a processing person) may perform approval. When performing approval, the cloud document can be viewed and edited. After confirming that there are no errors, the approval is passed, and the business processing node moves to a next node.

In some embodiments of the present disclosure, the method further includes: when creating an item template, determining a save address of an online document in the item template, saving an online document in a processing item created based on the item template to the save address. Alternatively, when creating the first processing item, a save address of a first online document is determined, and the first online document is saved to the save address. In some embodiments, a save control may be provided to control whether to save the online document through the save control. In response to determining that the online document is to be saved, an interface for determining an address for saving the online document is provided, and the address selected or entered is used as the address for saving the online document. In some embodiments, the save address of the online document, such as the save address of the first online document, may be a node of a document storage center, and the selected cloud document storage center (referred to as wiki) node can be used as the save address, and an option is provided to select whether to provide the owner of the online document (such as the first document) to the wiki owner.

In some embodiments of the present disclosure, the method further includes: in response to the trigger operation for the first operation item performed by the processing person of the current business processing node of the processing flow, viewing the first operation item, and in response to the processing person's processing operation for the first operation item, performing corresponding processing item according to the processing operation. The processing person of the current business processing node can view the first operation item, and when the processing person has a read or edit permission for the first online document, he/she may read or edit the first online document. The processing person may process the operation item, such as agreeing with the first operation item so that the processing flow moves to the next business processing node, or disagreeing the first processing item, thereby ending the processing flow.

In some embodiments of the present disclosure, a first processing item is created in a control (e.g., Mini Program) of a target communication software. In some embodiments, the first application is associated with the target communication software, and the account in the first application and that in the target communication software are associated with each other. The method in the embodiment of the present disclosure can be executed through the control of the target communication software, such as creating a first processing item and triggering a processing flow of the first processing item.

In some embodiments of the present disclosure, the method further includes: displaying the first processing item in a subsoftware of the target communication software of the processing person of a node of the processing flow. In some embodiments, the executor of the method may be a first application such as an approval program, the first application may communicate with and associated with the target communication software, the target communication software may be, for example, an instant communication software, the user account of the first application and that of the target communication software are associated with each other, communication is matched through the account, thereby achieving integration of two software systems. By matching through the account, the communication between the first application and the target software is achieved. The processing person of the node in the target communication software may process and access the first processing item and the first online document through the target communication software, may comment on the first online document when having a comment permission, may read the first online document when having a read permission, and may edit the first online document when having an edit permission. The operations performed by the processing person on the first processing item and the first online document on the target communication software will be synchronized to the first application, so that the user can conveniently process the first processing item without having a material submitting permission or an accessing permission for the first application, in which an accessing permission of the first application is not needed to be granted to the user. Through the target communication software, external users of the first application may process a first processing time limit or complete the material submission work with the permission diffusion capabilities for the first document, such as comment permission and edit permission. For example, the control for displaying the first processing item can be embedded in the Mini Program of the target communication program, for example, the control may be embedded in the approval component, reporting component, task and key node component or other components of the target communication software. The first processing item and the first online document may be viewed and processed through these components. This technical solution can be used for any business scenario where documents are used for carrying information. FIG. 5 schematically shows the display interface of the first application, in which a processing item list is displayed, and the processing item selected in the processing item list will be displayed in detail.

Figure 7:
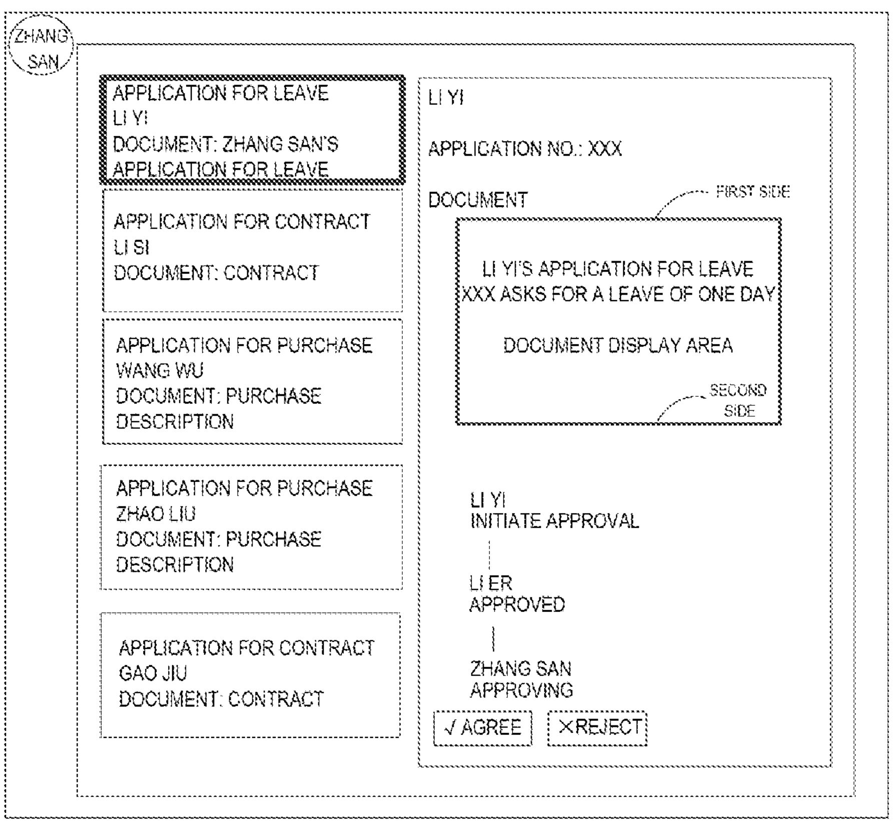
FIG. 7 is a schematic display of a target communication program according to an embodiment of the present disclosure.

In some embodiments of the present disclosure, an entry identification of the first processing item (an item in the processing item list) is displayed in the target communication software of the associated person (creator, processor, etc.) of the first operation item. After the entry identification is triggered, the content of the first processing item is displayed, and the name of the first online document in the first processing item can be displayed in the entry identification. As shown in FIG. 7, relevant information of the business processing node of the business processing flow can also be displayed, such as the associated person of the business processing node and processing status for the first processing item.

In some embodiments of the present disclosure, there is a document display area for displaying the first online document in a display interface of the first processing item, and the size and/or position of the document display area can be adjusted. In some embodiments of the present disclosure, an inline frame can be provided in the control for displaying the first processing item, and the inline frame can be used as a document area for displaying the first online document. The inline frame can be an iframe. For example, when displaying the first processing item in the Mini Program of the target communication software, the inline frame can be loaded in the Mini Program to display the first online document in the inline frame. The size of the document display area for displaying the first online document can be adjusted, such as, the length and width of the document display area can be adjusted, and the display position of the document display area can be moved freely, thereby improving the user experience.

In some embodiments, the adjustment of the length dimension of the document display area can be realized in the following way. Herein, the length dimension can be a display length of the document display area, and the display length may refer to a size in the longitudinal direction of the display interface. In a control for displaying the first processing item, a display container is provided, the display container can be a View object, which may have an initial length and a maximum length. The inline frame is disposed in the display container, and the length dimension of the document display area can be changed by dragging the edge of the display container. The display container is used as an operation object of the dragging operation, and the display container can be disposed in the display area of the first operation item; the height in the z-axis direction of the display area of the first operation item is higher than that of other elements in the display area of the first operation item, so as to prevent the display container from being obscured by other elements, and the length dimension of the display container is not less than a minimum predetermined value, so as to ensure that the display container can be operated In some embodiments of the present disclosure, associated operation elements are provided in the document display area, for example, the operation element may be a display container described above. The first mode is entered by triggering the operation element. After entering the first mode, the size of the document display area can be adjusted by dragging or predetermined method. In some embodiments, after the operation element is triggered, the current first height position (such as the position of a mouse or finger) is recorded. The current first height position may refer to a position in the direction of the length of the document display area. Through a predetermined operations such as dragging or sliding in the first mode, a second height position (such as the height position in a length direction of the document display area) when the predetermined operation is ended may be obtained. The height difference value is determined based on the first height position and the second height position. The size of the document display area may be adjusted according to the height difference value and the size of the document display area before the predetermined operation is performed, and then the size of the document display area after adjustment is obtained and displayed. In some embodiments, a size range for the document display area is set in advance, and if the size of the adjusted document display area is greater than a maximum value of the size range, the size of the document display area is set to the maximum value of the size range. If the size of the adjusted document display area is smaller than a minimum value of the size range, the size of the document display area is set to the minimum value of the size range. A specific embodiment is listed below, which includes: triggering a start event by clicking on an operation element; entering a dragging mode at this time and recording the height position (of a mouse or a finger) in the length direction of the document display area at this time; holding down the mouse or the screen (touch screen) in the drag mode to trigger a movement adjustment event by dragging or sliding; calculating, according to the position of the mouse (or finger) obtained in each movement adjustment event, a difference between the obtained height position and the height position recorded when entering the dragging mode; then adding the calculated difference value on the basis of the size of the existing document display area to obtain a new size; performing threshold verification on the obtained new size; if it exceeds a threshold value, stopping it at the threshold edge (i.e., maximum or minimum value), then setting the size of the document display area, and finally when releasing the mouse (or finger), setting the last size in this dragging mode in the event and closing the dragging mode after recording the size of the display area.

Figure 8:
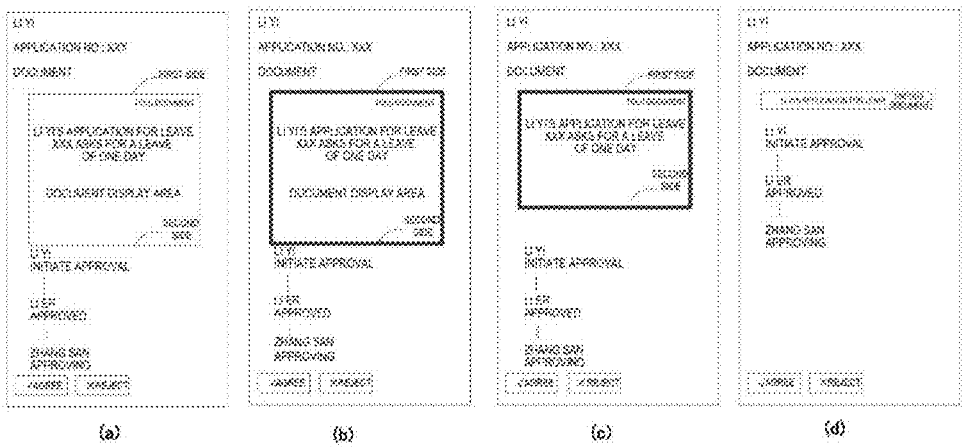
FIG. 8 is a schematic variation of a document display area according to an embodiment of the present disclosure.

In some embodiments of the present disclosure, please refer to FIG. 8 (*a*), the document display area has first and second sides, the first and second sides can be the edges of the document display area in a longitudinal direction of the display interface for displaying the first processing item. In response to a selection operation for the document display area, the selection operation may include suspending the control identification such as a mouse in the document display area. After selecting the document display area, as shown in FIG. 8 (*b*), the display style of the document display area can be changed. In response to the first predetermined operation performed after the document display area is selected, the position of the first side of the document display area in the display interface is fixed, and the position of the second side in the display interface is changed. For example, the first predetermined operation can be an operation of scrolling up the mouse. The first side may be an upper edge of the document display area in a longitudinal direction of the display interface, and the second side is a lower edge of the document display area in the longitudinal direction of the display interface. After selecting the document display area, the upper edge can be fixed and the position of the lower edge can be changed by rotating the mouse shaft, so as to change the size of the document display area, as shown in FIG. 8 (*c*). For example, the document display area can be quickly folded by rotating the mouse shaft in a first direction, and the document display area can be quickly stretched by rotating the mouse shaft in a second direction. In some embodiments of the present disclosure, when the distance between the first side and the second side of the document display area is greater than a predetermined distance, if the second predetermined operation is performed, the first side is fixed at a position of the display interface and the distance between the second side and the first side is reduced. For example, the first side is an upper edge of the document display area, and the second side is a lower edge of the document display area. When the distance between the first side and the second side is large, the user's view of the first operation item will be hindered, so a second predetermined operation (such as scrolling up the mouse shaft) can be performed to fix the first side and change the position of the second side to reduce the spacing distance between the first and second sides, thereby realizing the technical effect of quickly folding the first online document, solving the problem that the user is hindered from viewing other information due to the excessively long document display area, that is, when the document display area has a height greater than or equal to a default height, the first online document can be quickly folded by fixing the top (first side) of the document display area when scrolling up. In some embodiments, the spacing distance between the first and second sides of the document display area must not be less than a predetermined minimum value. When the spacing distance between the two reaches the predetermined minimum value, it is impossible to continue to reduce the size of the document display area in the longitudinal direction. In some embodiments, as shown in FIG. 8 (*c*), a folding control is displayed in the document display area. After the folding control is triggered, the document display area is folded, for example, the document display area is hidden. At this time, only an identification of the first online document can be displayed. After the document display area is folded, as shown in FIG. 8 (*d*), an unfolding identification may be displayed, and after the unfolding identification is triggered, a document display area may be displayed.

In some embodiments of the present disclosure, after the document display area is selected, when the control identification (e.g., a mouse) moves to an edge of the first or second side of the document display area, the style of the control identification may be changed, and after the style of the control identification is changed, the control identification can be used to change the position of the first side or the second side, thereby the size of the document display area is changed.

In some embodiments of the present disclosure, in a display interface of the first processing item, the default size of the document display area of the first online document depends on the content amount of the first online document. When the content amount of the first online document is greater than a content amount threshold, a first predetermined size can be used. When the content amount of the first online document is not greater than the content amount threshold, a second predetermined size is used, and the first predetermined size is greater than the second predetermined size. The document display area can be located in an area below a title of the first processing item in the display interface of the first processing item.

In some embodiments of the present disclosure, in order to ensure the control smoothness and meet performance requirements, a size adjustment frequency of the document display area can be limited, and the size adjustment frequency of the document display area per unit time is not higher than a predetermined frequency, for example, the frequency threshold of a frequency for resetting the size per second is controlled, and whether to refresh the display interface when the frequency exceeds the frequency threshold is configured. For example, when the size adjustment frequency of the document display area exceeds the frequency threshold, the display interface is not refreshed to reduce performance requirements, so that when the size of the document display area is adjusted a plurality of times, the display interface can be refreshed only when the time elapsed after adjusting the document display area reaches a predetermined time length and the size adjustment operation of the document display area is no longer detected, thereby saving computing power.

Figure 9:
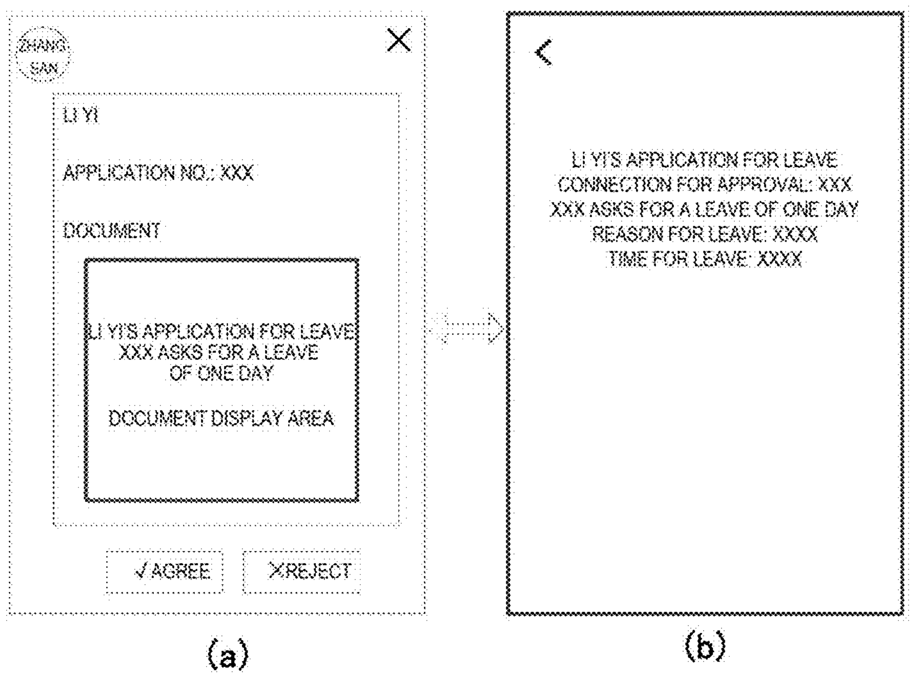
FIG. 9 is a schematic diagram of non-full screen and full screen displays of a first online document in service data according to an embodiment of the present disclosure.

In some embodiments of the present disclosure, as shown in FIG. 9 (*a*), when displaying the first processing item, after the area where the first online document in the first processing item is located is triggered, as shown in FIG. 9 (*b*), the first online document can be displayed in full screen. This can meet browsing needs of mobile devices. When the first online document is displayed in full screen, the display of first online document in full screen can be exited, and the first processing item will continue to be displayed after exiting.

In some embodiments, the creator of the first processing item is the owner of the first online document, and the creator needs to grant permissions for the first online document to allow other users to have a read permission, an edit permission and other permissions, so as to solve the processing problems of different users. In some embodiments, a processing person of a node of the processing flow can be added as a collaborator of the first online document, and required or pre-set document permissions may be assigned to the node. In other embodiments, a link sharing function of the first online document can be enabled, and the user who obtains a sharing link of the first online document can be set to have predetermined permissions (such as a read permission or an edit permission), and a password can be set for the sharing link In this way, by adding the sharing link of the first online document in the first processing item, other users may obtain predetermined permissions when opening the link of the first online document in the first processing item.

In some embodiments of the present disclosure, the creator of the first processing item is the owner of the first online document, and after triggering the processing flow of the first processing item, the ownership of the first online document is transferred from the creator of the first processing item to a first application, and the read permission of the creator for the first online document may be retained but the edit permission of the creator for the first online document may not be retained. When triggering the processing flow of the first processing item, permissions of processing persons of non-current business processing nodes of the processing flow may all be readable but not editable. Only the current business processing node may have the edit permission (whether it has edit permission depends on whether the edit permission is granted for the processing person of the node in advance); after the processing flow of the first processing item is completed, the ownership of the first online document is returned to the creator of the first processing item.

In some embodiments, after the first processing item is initiated, if the creator of the first processing item is not the owner of the first online document (i.e., the person with ownership), the first online document cannot be added to the first processing item, and the first online document can only be added to the first processing item when the owner of the first online document is the creator. After the processing flow is triggered to start, the ownership of the first online document is transferred to the first application, so that the first application can assign the permissions for the first online document to the processing persons of other nodes. After the processing flow of the first processing item ends, the ownership is returned to the creator.

In some embodiments, during the execution of the processing flow of the first processing item, the permission (read permission or edit permission, where the edit permission includes read permission) possessed by the processing person of the business processing node can be granted to the processing person according to the predetermined setting; the read permission and the edit permission can be granted to the processing person by default, or the edit permission can be granted only to a predetermined processing person. In addition, if the read permission is not granted to the processing person of the current node, the processing person of the current node cannot read the first online document.

In some embodiments, after the processing flow of the first processing item is completed, the edit permission of the first online document will be revoked from the processing person, and the permission of the processing person for the first online document will be set as a read permission.

In some embodiments of the present disclosure, during the execution of the processing flow, the edit permission for the first online document may only be granted to a processing person in the current business processing node of the processing flow who has the edit permission; After the processing flow is ended, the permission for the document assigned to the processing person of the business processing node will be revoked.

In some embodiments, if the creator cancels the processing flow of the first processing item, ownership of the first online document may be returned to the creator of the first processing item from the first application, and the permissions of the processing persons of all business processing nodes for the first online document (the read permission and the edit permission) are revoked. That is, the permissions of the processing persons of the business processing nodes for the first online document restore to a state before creating the first processing item.

In some embodiments of the present disclosure, after the processing person of the current business processing node rejects the first processing item, the permission of the processing person of the current business processing node for the first online document is revoked and the ownership of the document is returned to the creator of the first processing item.

In some embodiments of the present disclosure, when the processing person of the current business processing node transfers the processing task of the first processing item to further processing person, the permission of the processing person of the current business processing node for the first online document is applied to the further processing person, for example, if the processing person of the current business processing node has a read permission, the further processing person will also be assigned with the read permission, and the permission of the processing person of the current business processing node for the first online document is retained.

In some embodiments of the present disclosure, after the processing person of the current business processing node adds a business processing node, the permission of the processing person of the current business processing node for the first online document is applied to the processing person of the added business processing node, and the permission of the processing person of the current business processing node for the first online document is retained. If the processing person of the current business processing node has a read permission for the first online document, the processing person of the added business processing node will also have read permission.

In some embodiments of the present disclosure, after a business processing node in the processing flow is removed, the permission of the processing person of the removed node for the first online document will be revoked, and the permission of the processing person of the removed business processing node for the first online document may restore to a state before creating the first processing item.

In some embodiments of the present disclosure, when the processing person of the current business processing node returns the processing flow to the previous node, the permission of the processing person of the current business processing node for the first online document will be applied to the processing person of the previous node. For example, the processing person of the current business processing node has a read permission, and the processing person of the previous node will also have the read permission. In some embodiments, if the business processing node is returned to the creator of the first processing item, it is necessary to grant the edit permission for the first online document to the creator.

In some embodiments, after the first processing item is carbon copied or shared, the carbon copied or shared user only has a read permission for the first online document in the first processing item, but not has an edit permission.

In some embodiments of the present disclosure, during execution of the processing flow of the first processing item, the first processing person is a processing person in at least two business processing nodes. After the first processing person processes the first processing item at a business processing node for which he is responsible and there is still an unprocessed business processing node for which the first processing person is responsible, if the content of the first online document changes, the first processing person will process the first processing item again at the unprocessed business processing node. For example, there are three business processing nodes, and processing person A is responsible for the first and third nodes. The current processing flow proceeds to the second business processing node. At this time, if the content of the first online document changes, the processing person A is still required to process the first processing item at the third business processing node, and the processing person A will not stop processing the first processing item due to that the processing person A has already processed the first processing item.

In some embodiments of the present disclosure, the first processing item is combined with the first online document, thus improving communication efficiency and supporting height adjustment of the document display area of the first online document and free dragging and dropping, which can display the first online document in full screen as well as fold the full screen display.

For the approval scenarios of enterprises for complex decision-making information, such as document approval such as official documents and regulations, as well as attachment approval such as supplier/product qualifications and contracts, by deeply integrating approval with cloud documents, some solutions disclosed herein integrates the account, permission, information notification and etc. of the application such as approval and cloud documents at the bottom, embedding cloud document components through iframes and other methods at the front end, and supporting approvers to freely drag the displayed window size, the best experience of approval combined with cloud documents is ultimately achieved.

Regarding the field of integrating the account, permission, information notification etc. of the application such as approval and cloud documents at the bottom, the permissions for the cloud documents (also known as online documents or collaborative documents) and information notifications can be processed according to a business processing logic of the application. For example, a predetermined cloud document permission can be granted to a processing person or a personnel role of the predetermined business node, or when the content of cloud documents changes, such as when the comment content changes, notification messages can be sent to relevant processing persons of predetermined nodes of the application, so that the relevant person can timely obtain changes in the content of cloud documents. Since the notification is related to person of the business processing node of the application, the integration of the two can be strengthened to ensure that the message can reach the business processing persons of the business program in a timely manner.

In some embodiments of the present disclosure, the cloud document component can be added to the approval flow (also referred to as the approval program): through approval management backend, the cloud document component can be added, and the name, display condition, printing status, archiving location, etc. of the cloud document can be set.

In some embodiments, the integration of Mini Program and cloud document can be achieved: by solving problems in the account, permission, and message communication between Mini Program and web application (such as cloud document), the integration and communication of the two can be achieved.

In some embodiments, regarding display of a cloud document, the cloud document can be embedded in the approval page through iframe, which supports the approver to freely drag the document window to change the size of the document window, and supports operations such as one-click hide, one-click full screen, etc.

In some embodiments, collaboration between the current tenant and external tenants of the application such as approval can be achieved. The tenant can be understood as a group identification or an organization identification, generally, different enterprises can be understood as different tenants. Granting external edit permission through the cloud document, the problem of cross-tenant content approval can be solved.

In some embodiments, regarding the operation permissions of approvers for cloud documents, through approval management backend, setting of permissions of each approver or approval role for cloud document can be supported, such as an edit permission, a read permission, a sharing permission, etc.

In some embodiments, regarding transferring the owner of cloud document, the application is associated with the cloud document, and after the application proceeds to a predetermined business processing node or reaches a predetermined business processing state, the owner of the cloud document can be changed to the application or business processing person related to the cloud document in the application, thereby facilitating subsequent permission changes. For example, in the approval scenario, after submitting approval, the owner of the document is transferred from the initiator to an application by calling a document owner transferring interface, which facilitates subsequent application to change permissions for document.

In some embodiments, regarding the cloud document permission processing, in the approval scenario, along with the approval processing such as approving/rejecting, transferring, adding/removing signatures, returning, CC, sharing, etc., the document "updating collaborator permission" interface is called to change permission for the cloud document.

In some embodiments, based on the change in document content, deduplication can be performed on the processing person that appears repeatedly in the application to avoid the same person from repeatedly processing the same document content. For example, in the approval scenario, regarding processing of the approval and document content changes, when the same approver appears repeatedly in the approval flow, if the document content changes, it needs to be re-approved; otherwise, the approver is automatically skipped, that is, if the document content has not been changed and the document content has already been approved by the approver of the current approval node in the approval flow, the approver may be automatically skipped.

In some embodiments, regarding writing the document content, through the association between the business data of the application and the document, the business data or a processing node link related to the business data can be embedded in the document, or a new document can be generated based on the above business data or processing node link. For example, in the approval scenario, the approval link can be written into the document through the association between an approval documentation and the document, and the approval can be returned to with one click to view the approval detail information.

In some embodiments, a category "cloud work" and a "cloud document" control are added at the approval administration backend, and a control name, prompt text, a permission setting entry can be set.

In some embodiments, automatic archiving can be supported, and whether to archive cloud documents after approval can be selected. If archiving is selected, the wiki is opened and a specific wiki node to be archived is selected; whether to transfer the owner of cloud documents to the wiki leader may also be selected.

By performing ID matching based on the account of the application associated with the cloud document (for example, the approval program and the cloud document share the same ID, or the IDs of the two are related), communication is carried out, and the ability of permissions such as comment notification, document reading and editing is obtained, and the integration of the two applications is realized. Initially, the submitter does not have a permission to access the other party's approval program and materials cannot be submitted; with the permission diffusion ability of the document, external users can complete the work of material submission.

Application scenarios: cloud document components can be embedded in any Mini Program, including Mini Program approval, reporting, OKR, and any other mini program.

This technical solution can be used in any business scenario that carries information with documents.

Web cloud documents and Mini Program approval applications can be integrated and displayed through iframe.

The best browsing and approval experience can be achieved by adapting the front-end to the height of the cloud document component and supporting free dragging of the document window.

Implementation of Freely Dragging the Height of the Document Window:

Layout: In the Mini Program, View is used as a container, and the container has an initial height and a maximum height. The iframe component of the document is disposed inside the View container, and a View is added as an operation element of dragging and dropping. The operation element is located at the bottom of the container element, the level is higher than any other element in the container and has a slight height to guarantee that it can be clicked.

Interaction: triggering the touchstart event by clicking on the operation element, entering a dragging mode at this time and recording the height position (of a mouse or a finger) at this time, holding down the mouse or the screen (touch screen) in dragging mode to trigger the touchmove event by dragging or sliding, calculating the difference between the obtained position height and the recorded height when entering the dragging mode based on the mouse (or finger) position obtained in each touchmove event (a negative value is possible), then adding the calculated difference value on the basis of the existing container height to obtain a height value; performing safe threshold verification on the obtained new height; if it exceeds a threshold value, stopping it at the threshold edge (i.e., maximum or minimum value), then setting a new height for the container, and finally when releasing the mouse (or finger), setting the last height in this dragging mode in the touchend event and closing the dragging mode after recording the height of the container.

Cut-off: In order to freely control the balance between fluency and performance, the cut-off can be performed on the height setting frequency to control to reset the height setting frequency per second and whether to refresh the interface when exceeding the threshold. The actual frequency in implementation can be a stepless control between the triggering frequency of the touchmove event and 0 times/second, but in actual product, it will be limited to a fixed value. The specific value should be obtained by comprehensively considering the actual product requirements, fluency experience, and software performance.

It supports adaptation at mobile end, and browsing in full screen can be implemented by clicking on the cloud document component.

Regarding the processing of permissions for the cloud document, in some embodiments, in the approval scenario, an external edit permission for cloud document can be granted by the approval initiator (such as document owners), so that the content supply person of the external tenant may have document edit permission, so as to solve cross-tenant content approval scenarios.

Method 1: Adding a person for external collaboration as document collaborators and assigning the edit permission.

Method 2: Enabling link sharing, setting it to "editable by a person who obtains the link on the Internet", and adding a password.

In the approval flow, each approver can be granted with permission for documents such as a "readable" permission and "edit" permission.

An exemplary explanation of changes in document permissions is as follows:

Regarding permission revocation: after the initiator submits the approval, the owner of the document is transferred to an approval application. The approval application revokes the edit permission of the document collaborator, but does not revoke the read permission, and other users can only read it.

Regarding permission release: the approval flow is returned to the initiator, the owner of the document is still the approval program, but the edit permission is released to the original editor or owner before submitting the approval.

Regarding permission granting: during the approval flow, according to the background settings, the read and edit permissions of the approvers of the corresponding approval flow are granted (the background sets the read/edit permissions of specific approvers), and the "readable" and "edit" are granted by default. The edit permission is only granted to the approver.

If the "readable" permission is not granted, the "cloud document control" is not visible to the person of the current node.

Regarding permission revocation: after the approval is completed, the "edit" permission of the approver at this node will be revoked, and the approver only has the read permission.

Regarding the permission processing operated by the initiator, when revoking the approval request, the owner of the document is returned to the initiator from the application. And the document collaboration permission of all approvers is revoked.

Regarding the Permission Processing Operated by the Approver:

In case of approval rejection: the current approver revokes document permissions, including edit/read permissions, which is deemed as removal of collaborators. At the same time, the owner of the document is returned from the application to the initiator.

When transferring approval items to others for approval: the document permission of the current approver is applied to the transferred person. If the current approver has a read permission for the document, the transferred person will be granted with the read permission for the document. At the same time, the original permission of the approver is retained.

In the case of adding approvers, that is, when adding other approvers: the document permission of the current approver is applied to the added approver. If the current approver has a read permission for the document, the added approver will be granted with read permission for the document. At the same time, the original permission of the approver is retained.

In the case of removing approvers, that is, when removing a approver: revoke the document permissions of the approver whose approval is removed.

In the case of returning back, that is, when the approval flow is returned back to the previous approval node: the document permission of the current approval node is granted to the returned person. If it is returned back to an initiator, the initiator needs to be granted with an edit permission.

In the case of CC (Carbon Copy) and sharing, i.e., when the approval item is carbon copied to others or shared with others, the CC or shared person may only be granted with a predetermined permission for, such as a read document permission.

Automatic deduplicating of approver can also be realized: for scenarios where the same approver has to perform approval at different nodes, if the document content changes after approval by the approver, a re-approval has to be performed at the next approval node. For example, whether the document version has undergone a predetermined change can be determined by calling the document version changing interface or obtaining document version information, so that when the predetermined change occurs, the document may be approved by the corresponding approver. Alternatively, when there is no predetermined change, when the approver at a certain node has viewed the corresponding information of the current version, the approver may be skipped to avoid repeated approval.

By taking approval as an example as above, an exemplary explanation has been given for the change of document permissions with business logic and business flows. It can be seen that when an application is associated with a cloud document, the permissions for the cloud document can be processed based on the business processing logic and the business processing flow of the application. For example, when a predetermined business processing node is reached, the document permission of the relevant person of the node is changed. Another example is to revoke the document permission of the predetermined person after the process of the predetermined business node is completed.

Figure 10:
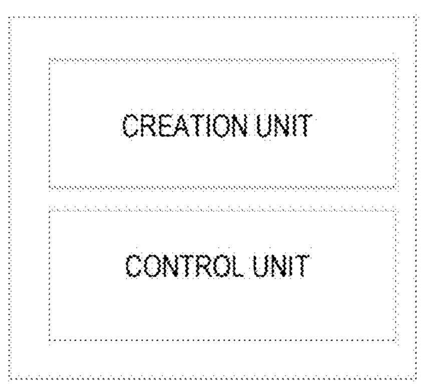
FIG. 10 is a schematic diagram of an apparatus for information processing according to an embodiment of the present disclosure.

As shown in FIG. 10, the present embodiment also provides an information processing apparatus, including:

a creation unit configured to create a first processing item in response to a first operation event, the first processing item having a first online document;

a control unit configured to trigger a processing flow of the first processing item in response to the second operation event.

According to one or more embodiments of the present disclosure, there is provided an apparatus for information processing, and the apparatus for information processing further includes a setting unit configured to set a business processing node of the processing flow and document permission of the processing person of the business processing node in response to a process creation operation.

According to one or more embodiments of the present disclosure, there is provided an apparatus for information processing, and the apparatus for information processing further includes a template creation unit configured to create an item template of the processing item, and a control for adding online documents is included in the item template;

the first processing item is established based on the item template.

According to one or more embodiments of the present disclosure, there is provided an apparatus for information processing, where the control unit is further configured to display the first processing item in a control of the target communication software of the processing person of the node of the processing flow.

According to one or more embodiments of the present disclosure, there is provided an apparatus for information processing, where a document display area for displaying the first online document is displayed in the display interface of the first processing item, the document display area, and the size and/or position of the document display area can be adjusted.

According to one or more embodiments of the present disclosure, there is provided an apparatus for information processing, where, the creator of the first processing item is the owner of the first online document, and after triggering the processing flow of the first processing item, the ownership of the first online document is transferred from the creator of the first processing item to a first application; after the processing flow of the first processing item is completed, the ownership of the first online document is returned to the creator of the first processing item.

According to one or more embodiments of the present disclosure, there is provided an apparatus for information processing, during the execution of the processing flow, the edit permission for the first online document may only be granted to a processing person in the current business processing node of the processing flow who has the edit permission; After the processing flow is ended, the permission for the document assigned to the processing person of the business processing node will be revoked.

According to one or more embodiments of the present disclosure, there is provided a method of information processing, including:

before the predetermined processing node corresponding to the processing request for a first file, determining a target save address of the first file in response to a user operation, so that the first file is saved to the target save address after the processing request is processed.

Figure 11:
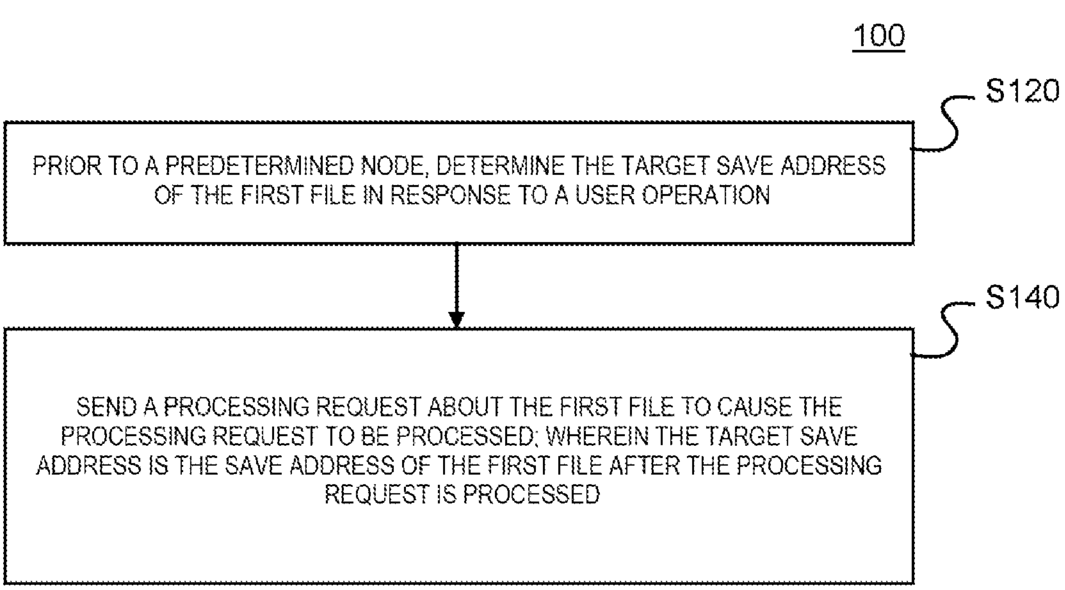
FIG. 11 is a flowchart of a method of information processing according to an embodiment of the present disclosure.

Referring to FIG. 11, FIG. 11 shows a flowchart of a method of information processing 100 according to an embodiment of the present disclosure, the method 100 includes:

Step S120: prior to a predetermined node, determine the target save address of the first file in response to a user operation.

Step S140: send a processing request about the first file to cause the processing request to be processed; where the target save address is a save address of the first file after the processing request is processed.

In some embodiments, in response to a user operation for the predetermined identification, one or more levels of file save directory stored in advance is displayed, and the user may select a specific target directory location in the file save directory, so that the target save address of the first file can be determined according to the directory location selected by the user.

As an example, the processing request may be a request for requesting one or more users to approve the first file.

In some embodiments, the first file includes but is not limited to a document, an image, a multimedia electronic file, a program file and the like.

In some embodiments, the processing request may include the first file or link information corresponding to the first file, so as to facilitate the processing person of the processing request to obtain the first file, thereby speeding up the processing flow.

It should be noted that before the predetermined node, before the processing of the processing request is completed, for example, when the processing request is created, before the processing request is sent, or during the processing of the processing request.

Preferably, step S120 is executed before the processing request is sent, such as when the processing request is created, so that no additional operation steps for setting the target save location of the first file are required, thereby the efficiency of saving files is improved and manpower is saved.

Figure 12:
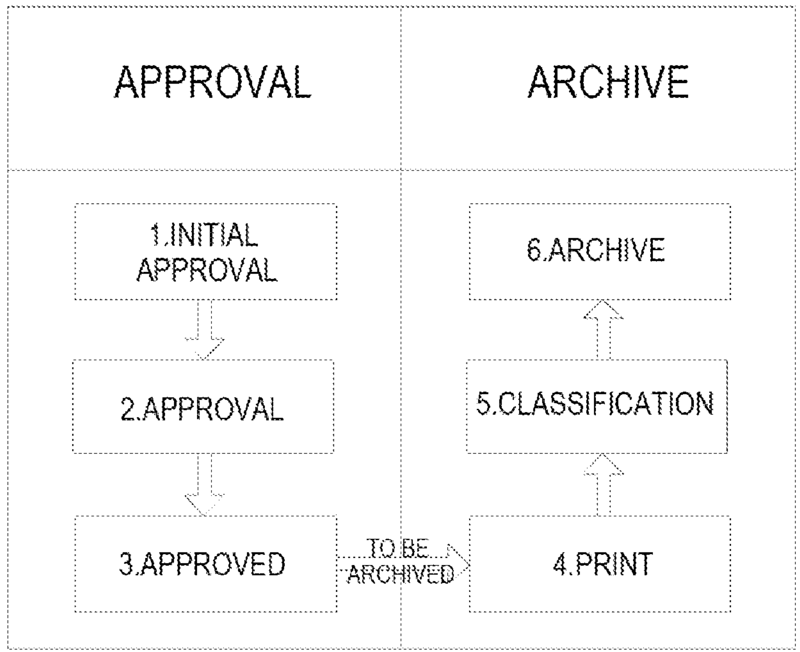
FIG. 12 is a flow chart of the approval process and the filing process of the related art.
Figure 13:
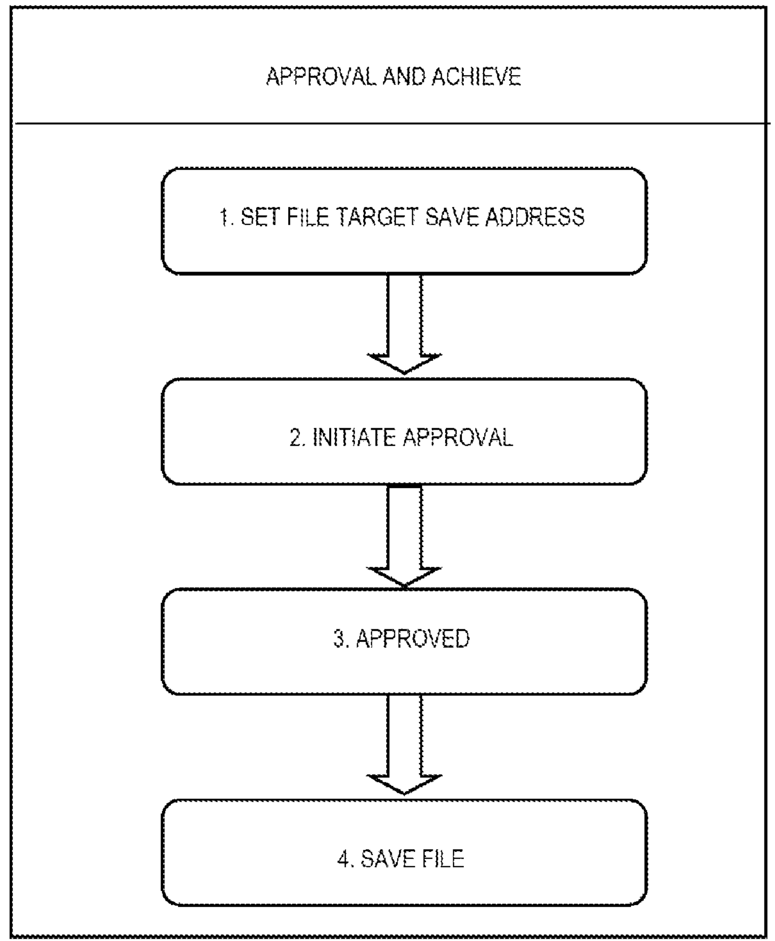
FIG. 13 is a flowchart of an approval filing process according to an embodiment of the present disclosure.

Description is provided in the following by taking file approval as an example. Referring to FIG. 12, the relevant file approval and archiving process (manual archiving) includes initiating a file approval request; approving the file by one or more persons; and if the approval is passed, printing, classifying, and archiving the file. Similarly, special operation steps are also required by the electronic archiving process to electronically archive the files after the approval flow is completed, and the archiving efficiency is low, which requires additional manpower. Referring to FIG. 13, according to one or more embodiments of the present disclosure, before initiating approval, the relevant person may set a certain directory in a certain cloud storage space to which the file to be approved should be saved after approval. In this way, when the approval of the file to be approved is completed, the system can automatically save the file according to a pre-defined archiving strategy without special archiving operations, thus realizing synchronization of document archiving and document approval, thereby improving the efficiency of approval and archiving and saving manpower.

According to one or more embodiments of the present disclosure, before a predetermined node, the processing request for the first file can be processed based on the user operation for determining the target save address of the first file, and the first file is automatically saved to the target save address. There is no need to wait until the processing of the processing request is completed to save the file by a special file save operation, thus achieving synchronization of file storage and processing of the processing request, thereby improving the efficiency of file processing.

In some embodiments, before performing step S120, the method further includes: in response to the user operation, it is determined whether to perform a predetermined save on the first file after the processing request is processed. For example, before initiating file approval, the user may set whether to archive the file after approval. If arching the file, the archiving address of the first file may be further set, that is, the target save address.

In some embodiments, the processing request includes information indicating the target save address. In the present embodiment, by further including the information indicating the target save address in the processing request for the first file, the first file can be saved to the corresponding target save address after the processing request is processed according to the information indicating the target save address.

In some embodiments, if the first file is a document, the method 100 further includes:

Step S150: after the processing request is processed, displaying processing information corresponding to the processing request at a predetermined position in the document.

In some embodiments, the processing information includes, but is not limited to, processing node information, processing person information, processing opinion information, processing time information.

Description is provided in the following by taking file approval as an example. According to one or more embodiments of the present disclosure, after the approval is completed, approval information about an approved document can be displayed at a predetermined position within the approved document, such as below the title. The approval information includes but not limited to approval node information, approval person information, approval opinion information, approval time information, etc., such as "approval node: department approval", "approver: department manager, Zhang San", "approval opinion: agree", "approval time: Jan. 1, 2021", so that subsequent users of the document can easily access the approval information related to the document by opening the document. For example, after the approval is completed, the approval information of the document can be automatically generated in the document through a predetermined API (Application Programming Interface).

In this way, by displaying processing information corresponding to the processing request at the predetermined position within the document after the processing request is processed, it is possible to facilitate subsequent possible review and recheck to the document or corresponding processing flow, such as enterprise financial review, audit, etc.

In some embodiments, the processing information includes link information configured to display the processing detail information in response to a user operation. In this way, by displaying the link information only within the document, the content of the document itself will not be overly affected, and it is also convenient for the user to click to view the processing detail information corresponding to the document. For example, the processing detail information includes, but is not limited to, processing node information, processing person information, processing opinion information, and processing time information.

In some embodiments, the method 100 further includes: step S101, storing a file save directory in advance; the step S120 including: in response to a user operation for the file save directory, determining the target save address of the first file.

For example, a file save directory of a cloud server can be created in advance and stored in the client, so that the user may select the target save address of the first file in the cloud server from the file storage directory; the file storage directory stored in the client can also be updated in real time or periodically through a predetermined interface, thereby realizing synchronization between the file save directory of the client and the save directory of the cloud server.

The following description is provided by taking cloud file approval as an example. According to one or more embodiments of the present disclosure, by using a cloud files as carrier of approval items containing files, when the user creates an approval, he/she may specify a specific cloud space archiving directory for the cloud file, and set corresponding directory nodes for approval form options, so that after the approval is completed, the cloud file included in the approval item is automatically archived to the corresponding cloud space directory nodes by calling the cloud space archiving interface, so as to achieve efficient and fast approval file archiving.

The traditional method includes judging whether to archive the approval documents and execute the archiving steps only after the approval is completed. This disclosure allows the approver to set whether the approval documents need to be archived and to which directory approval documents is archived before the predetermined node in the approval flow, such as before the approval is initiated or completed. Since the archiving provided is the archiving of cloud space storage, the archived content is not limited to text files, but also it supports different forms of electronic information recordings such as text, charts, audio, and video.

In some embodiments, whether the approval file corresponding to the approval program belongs to the files that have to be archived is verified, if so, for example, if the archiving information is not selected, or the approval is not passed, the next step (for example, archiving of the approval file) is not allowed.

In some embodiments, automatic archiving is achieved by establishing an association relationship between a cloud file storage center and the approval program, such as opening a directory interface of the cloud file storage center, calling the directory interface through the approval program, and storing the approval file corresponding to the approval program in a specified directory. The directory structure of the cloud file storage center can be set in advance.

In one embodiment, the directory structure information is called in the approval program based on the directory structure set in advance, so that the user may select a directory to which the specified online document is stored.

Further details are provided below, and the example is described below:

Regarding an Archiving Directory Interface:

In one method, one of the steps to achieve automatic archiving is to pre-set the archiving directory interface of the approval file. Through this archiving interface, automatic archiving can be carried out according to the archive directory designated by the relevant person after the approval is completed. The setting of the archiving directory interface firstly forms a standardized archiving information directory, and then exchanges system information between archiving directories through relevant interface technologies.

Of course, in other embodiments, the directory information can also be created or modified in the approval program and the newly created or modified directory information may be synchronized to the cloud file storage center to update the directory structure of the cloud file storage center, so as to facilitate users to update the cloud file directory flexibly in the approval program. In order to avoid non-standard file archiving due to the updating of the cloud file directory at any time by the user, predetermined verification rules may also be set, or a predetermined approval entry for directory update may be set. Only when the creation or modification of the archiving directory meets the predetermined verification rules, such new creation and modification are allowed. Alternatively, the modification and update of the archiving directory can be successfully performed at the cloud file storage center only through a directory modifying or creating request of the approval entry.

About the Archiving Directory:

The archiving directory is a directory configured to store files, which can be a folder used to store files. The archiving directory may include directories configured according to enterprise business, such as a first-level directory, a second-level directory, a third-level directory, etc. The archiving interface may save or mount the approval file at a specified location in the archiving directory, according to the file identification corresponding to the approval file, such as a Token, and the directory information corresponding to the target save address, such as directory information including the directory ID.

In some embodiments, the directory information corresponding to the target save address may be included in the approval file or the approval request, the directory information may include an archiving directory ID of the archiving directory in which the approval file needs to be archived and archiving description information. Archiving can be achieved by identifying the directory and archive description information in the directory information. For example, the archiving description information may include directory information of the archiving directory.

Typically, the finally determined archiving directory needs to be confirmed by the user, so as to ensure the accuracy of the archiving. Of course, the confirmation may not be necessary in some embodiments.

The archiving directory data structure can be a hierarchical structure such as a tree.

In an embodiment, the first online document can be generated or the content data carried in the first online document can be processed, according to the business data associated with the business node. In the approval scenario, approval information (also referred to as approval-related information) can be generated based on one or more of the approval nodes, approvers, and approval progress-related information in the approval program, and the approval information can be carried in the online document and subsequently archived in the cloud file storage center. A new online document can be generated, and the approval information can be written in the newly generated online document, or the approval information can be written in the approval information can be in a predetermined area of the existing online document. The written approval information can be displayed in a predetermined format. In one implementation, the approval information can be displayed in a predetermined format below the title of the online document, for example, the approval-related information can be displayed in the form of an API link Through the API link, the corresponding approval program may be jumped to or the detail information of the approval information is viewed. In one embodiment, the approval information may be information automatically generated after approval is passed, or information updated with the approval. The approval information may be written below the title of the online document in the form of a link through the API, and saved in the archiving directory. The approval-related information may include: name of each approval procedure, operators, opinion content, approval time and other information. Through the API interface, page information identification, predetermined field value extraction, etc., the approval-related information can be obtained from the approval program.

In addition to the archiving of the online document, the technical solution of the present disclosure can also be applied to the archiving of non-online documents in the approval flow, such as automatically an uploading non-online document to a specified archive directory, or converting the non-online document into an online document and then storing it in a specified archive directory.

Figure 14:
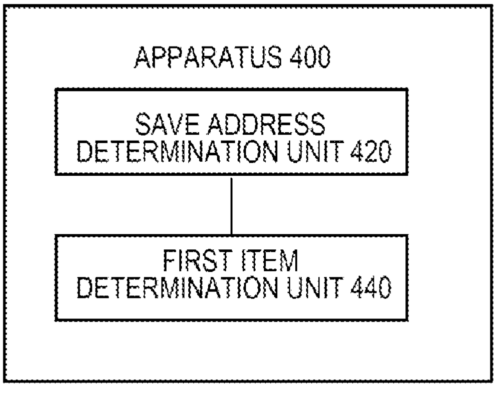
FIG. 14 is a schematic diagram of an apparatus information processing according to an embodiment of the present disclosure.

Accordingly, as shown in FIG. 14, there is provided an apparatus for information processing 400 according to an embodiment of the present disclosure, including:

- a storage address determining unit 420 configured to determine, before the predetermined node, a target save address of a first file in response to a user operation;
- a request sending unit 440 configured to send a processing request for the first file so that the processing request is processed; where the target save address is the save address of the first file after the processing request is processed.

In some document processing scenarios (such as enterprise approval scenarios), approval types such as official documents, regulations, qualification review, and contracts often rely on different information or file contents as decision-making basis. The approval flow involves communication and collaboration among a plurality of parties. When there are some changes in the content of the approval document or approval comment, in order to ensure the efficiency of the entire business flow, it is expected to notify the corresponding person in a timely manner, so that the business flow can be processed in a timely manner, thereby improving the processing efficiency of the business flow.

Figure 15:
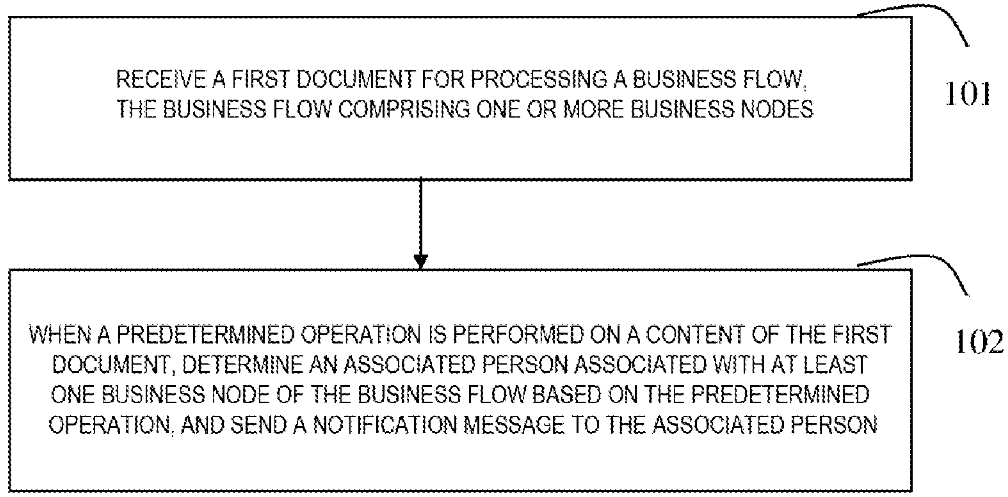
FIG. 15 is a flowchart of a method of information processing according to an embodiment of the present disclosure.

FIG. 15 provides a flowchart of a method of information processing according to an embodiment of the present disclosure. The method of information processing of the present disclosure may include: step 101, receiving a first document for processing a business flow, where, the business flow comprises one or more business nodes. In some embodiments, the first document is a cloud document or an online document. In some embodiments, the business flow is an approval flow, such as an approval flow for approving bills, contracts, purchase applications, etc. In some embodiments, receiving the first document means that the first document enters the business flow. In some embodiments, one or more relevant persons are required to review in the business flow, so the business flow includes one or more business nodes.

Figure 16:
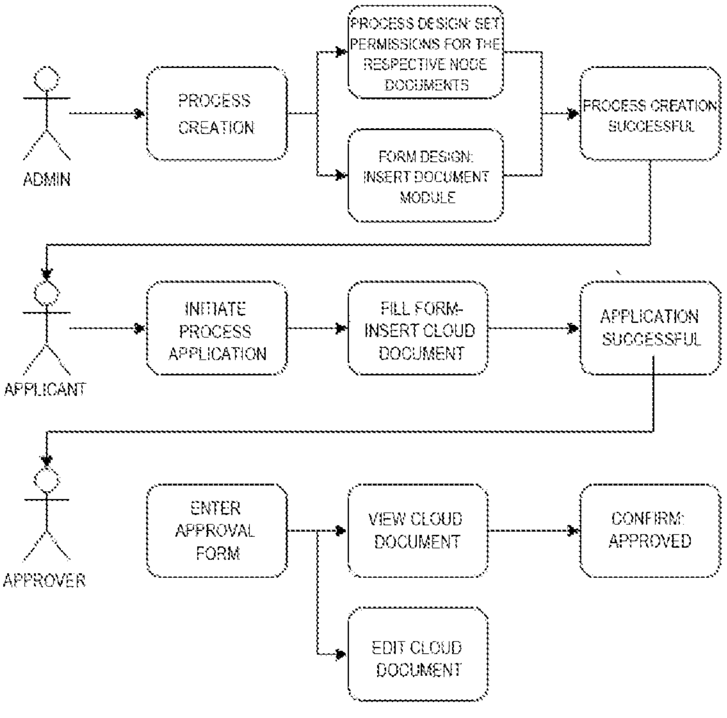
FIG. 16 shows a schematic diagram of a processing flow according to some embodiments of the present disclosure.

FIG. 16 is a schematic diagram illustrating a business flow by taking an approval flow as an example. In some embodiments, as shown in FIG. 16, the administrator firstly creates a corresponding approval flow, and designs the process to set a document permission for individual nodes in the approval flow. In addition, form design is performed to provide an insert document module. After the process is successfully created, the creator or applicant of the approval flow may initiate an approval flow application, fill out the form, insert cloud documents or upload documents. After the applicant's application is successful, the approver of each business node in the approval flow enters the approval form for approval. During the approval flow, the approver may usually view and edit cloud documents. After the approvers of all business nodes confirm that there are no errors, the approval is passed and the approval flow ends.

Figure 17:
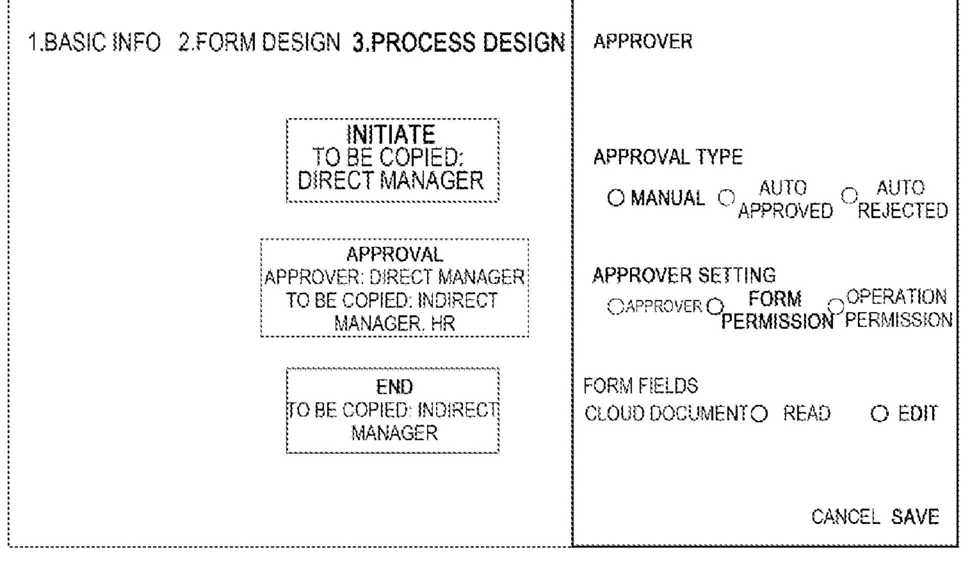
FIG. 17 shows a schematic diagram of the flow design according to some embodiments of the present disclosure.
Figure 20:
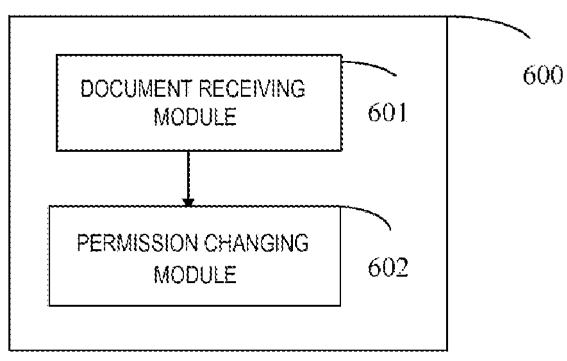
FIG. 20 is a partial module for an apparatus for information processing according to some embodiments of the present disclosure.

In some embodiments, the administrator will add a person who needs to process the cloud document to the business node, so that the person may obtain an assigned role for the cloud document. In some embodiments, when assigning roles, the administrator may specify that the processing person has a read permission and an edit permission for the document. As shown in FIG. 17, when the administrator designs the process, he/she may set a processing person and carbon copied persons at each stage, the processing type, and a corresponding permission of each processing person.

In some embodiments, the method of the present disclosure may further comprise step 102, when a predetermined operation is performed on a content of the first document, determining associated person associated with at least one business node of the business flow based on the predetermined operation, and sending a notification message to the associated person. Thus, the associated person can be notified in a timely manner of changes in the content of the first document, so that the business flow can be processed in a timely manner.

In some embodiments, receiving the first document includes the receiving a first document includes: adding an existing document into an interface of a first application, at this time, the first document includes the added existing document. In some embodiments, receiving the first document includes generating a new document within the interface of the first application, at this time, the first document includes the generated new document. In some embodiments, the first application is configured to process the business flow. For example, the first application is an application configured for approval flows. When there is a related item that needs to be approved, a related document of the item is established within the interface of the first application (for example, adding an existing document or generating a new document) to establish an approval flow for relevant persons to approve. Therefore, the way of creating related documents within the interface of the first application is flexible, the method is suitable for existing documents, at this time, the documents can be uploaded or added directly; besides, creating related documents may also include temporarily generating new documents.

In some embodiments, determining associated person associated with at least one business node of the business flow includes: determining a predetermined type of business node of the business flow, and determine the associated person of the predetermined type of business node. In this way, the associated person of different types of business nodes can be determined. In some embodiments, the predetermined type of business node includes a business creation node, and the associated person includes a person who created the business flow, such as an applicant or initiator of the business flow.

In some embodiments, the predetermined operation includes a comment operation, the first document is an online document, and the associated person includes a creator of the business flow. In some embodiments, the first document may include a comment area, the comment operation can be performed in the comment area, so that a person who can view the first document may comment on the content of the first document or the approval suggestions of individual nodes, so that the business flow can better achieve its intended purpose.

In some embodiments, the determining associated person associated with at least one business node of the business flow based on the predetermined operation and sending a notification message to the associated person includes: when no person is mentioned in content of the predetermined operation, sending a notification message to a person who created the business flow and/or a person who will perform a business operation on the first document during the business flow. In some embodiments, the mentioned person refers to the person mentioned in the content of the predetermined operation. For example, taking the comment operation as an example, the person mentioned with the @ symbol in the comment content can be considered as the mentioned person. When the mentioned person is not included in the content of the predetermined operation, a notification message can be sent to the person who created the business flow and/or the person who will perform business operations on the first document in the business flow, so that they can view the corresponding content in time, and then process the first document accordingly in a timely manner, thereby improving the overall efficiency of the business flow. In some embodiments, taking the comment operation as an example, the comment function is enabled by default in the business flow, which can help the processing person quickly notify the creator of the business flow and others of their processing opinions through the comment function, so that the corresponding person may adjust the content to be processed (such as the first document) in a timely manner based on the processing opinions. For example, as shown in FIG. 18, the comment content of Meng X is "Please pay attention to department information adjustment.", and there is no person be mentioned with @, that is, no person is mentioned. At this time, a notification message as shown in FIG. 18 is sent to the creator of the business flow and the person who will perform approval processing to facilitate the creator of the business flow and the corresponding approver to view and process the comment content in a timely manner, which is conducive to improving the processing and collaboration efficiency of the business flow.

In some embodiments, the determining associated person associated with at least one business node of the business flow based on the predetermined operation and sending a notification message to the associated person includes: when a person is mentioned in content of the predetermined operation, sending a notification message to a creator of the business flow and the mentioned person. For example, when a relevant person is mentioned with @ in the content of the comment, a notification message can be sent to the creator and the person mentioned with @ of the business flow. Typically, the content of the predetermined operation includes a mentioned person, indicating that the content is closely related to the mentioned person. By sending a notification message to the creator and mentioned person of the business flow, they can view the corresponding content in a timely manner, and then correspondingly process the first document in a timely manner to improve the overall efficiency of the business flow. For example, taking the comment operation as an example, as shown in FIG. 19, the comment content of Meng X is "Please pay attention to department information adjustment.", in which Zhang Z is mentioned with @, that is, Zhang Z is the mentioned person, at this time, a notification message as shown in FIG. 19 is sent to the creator of the business flow and Zhang Z to facilitate the initiator of the business flow and Zhang Z to view the comment content and thus process it in a timely manner.

In some embodiments, the determining associated person associated with at least one business node of the business flow based on the predetermined operation and sending a notification message to the associated person includes: when content of the predetermined operation is associated with a specific person and the specific person does not have a read permission for the first document, sending a reminder message to remind whether to grant the read permission for the first document to the specific person. In some embodiments, if the mentioned person in the content of the predetermined operation (herein, a specific person) does not have a read permission for the first document, this means that the specific person cannot view the first document. At this time, by sending a reminder message to remind whether to grant the read permission for the first document to a specific person, it can be determined whether to change the permission of the specific person for the first document, ensuring that the specific person can read the first document when the specific person is needed to participate in the business flow. For example, taking the comment operation as an example, as shown in FIG. 19, Meng X mentioned Zhang Z with @ in the comment, and Zhang Z does not have any permission for the first document; at this time, a reminder message is sent to remind whether to grant the read permission for the first document to Zhang Z.

In some embodiments, when it is determined to grant the read permission for the first document to a specific person, a notification message is sent to the specific person. In this way, it is avoided to send to a specific person a notification message that the specific person cannot view the corresponding content therein. For example, when the read permission has been granted to Zhang Z in FIG. 19, a corresponding notification message can be sent to Zhang Z at this time to facilitate the specific person (e.g., Zhang Z) to view the comment content in a timely manner In some embodiments, when it is determined that the read permission of the first document is not granted to a specific person, a notification message is not sent to the specific person.

In some embodiments, sending a notification message to the associated person includes: sending a notification message to the associated person in a predetermined communication software, and when a preset control in the notification message is triggered, jumping to a business node corresponding to the associated person in the business flow for corresponding processing. In some embodiments, suitable communication software can be selected to send the notification message, such as SMS, instant messaging software, or other suitable communication software. In addition, after a corresponding person clicks on the preset control (e.g., "Viewing Details" in FIGS. 18 and 19), the corresponding document to be processed can be directly jumped to for processing.

In some embodiments, the predetermined operation includes a modification operation for modifying the content of the first document, in which case the associated person includes a relevant person of a business node that has performed a business processing operation based on the first document before the modification operation. Thus, by sending a notification message to the associated person, the relevant persons who have performed the business processing operation can be notified that the content of the first document has changed, so that they can confirm whether they need to change the corresponding processing opinions in a timely manner. In some embodiments, based on the notification message, business processing opinions for the first document are revisable by the associated person of the corresponding business node. That is, when the content of the first document changes, the persons who have performed the processing operation may change their processing opinions, so that the first document and the processing opinions can remain being matched with each other.

In some embodiments, the notification message is configured to notify that a predetermined operation has been performed on the content of the first document. In some embodiments, for example, as shown in FIG. 18 or FIG. 19, the notification message includes at least one of the following: a type of the predetermined operation, a mentioned person, a creator of the business flow, content of the predetermined operation, content modification of the first document, a business flow identification or an identification of the first document, and business flow summary information. In some embodiments, types of predetermined operation include comments, modifications, etc. Thus, the notification message can present information related to the predetermined operation to the notified person.

In some embodiments, for applications such as approval of a cloud document, the cloud document comment function can be enabled by default during business processing such as approval, to achieve better business collaboration such as approval. Regarding the message sending when the comment content of the cloud document changes, in some embodiments, when the comment content of the cloud document changes, the processing person or approver can be notified in a timely manner by a technique of a robot sending message to pay attention to content change in the cloud document. The following two scenarios are described by way of example, where the cloud document is used as an example of the first document.

Scenario One:

When a specific person is mentioned in comment content of the cloud document, for example, the specific person is mentioned by using the @symbol (i.e., @person), if the @person being is a person at approval node, the approval robot may send a message to a submitter of the approval and the @person. If the @person does not have a permission for cloud document or is not a relevant person of the approval node, it can be prompted whether to grant the read permission for the cloud document to further party (the @person). If so, the read permission of the document will be granted to the further party, and the cloud document will notify the @person; if the read permission of the document is not granted, no notification will be sent. The notification will be provided in the form of a message card, after clicking the notification to view the details, the corresponding cloud document approval documentation in the approval application can be directly jumped to for approval. The content of the notification message may include comment content, an applicant submitting the approval (also known as the creator), an approval reason, etc.

Scenario 2:

When there is no @person in the content of the cloud document, notifications can be sent to the approval documentation submitter and the approver. The notification content may include comment content, an applicant submitting the approval (also known as an initiator), an approval reason, etc. The reasons for not sending to the approver in Scenario one include: 1. The @ is a scene that clearly needs to be replied to, so it is normal to send it to the @person. 2. At the same time, sending it to the initiator is to inform the documentation owner, and there is no need to disturb other approvers.

In some embodiments, the approval flow involves multi-party communication and collaboration, but the approval flow itself has to be rigorous, so the information or documents under approval should not be arbitrarily modified during the approval flow, otherwise the online cloud document cannot be used to carry information or files during the approval flow. However, when the approval is not passed, the creator of the business flow needs to modify the information or file, and after the approval is passed, the information or file is should not be allowed to be modified again at this time based on the enterprise archiving requirements.

In some embodiments, before receiving the first document, that is, before the creator or applicant of the business flow successfully applies, an author of the first document has a first permission for the first document. Such author may be understood as a collaborator, who may be at least one of the collaborators. In some embodiments, after receiving the first document, a permission of the author for the first document is changed to a second permission, which is different from the first permission. That is, after entering the business flow, the system (e.g., the first application) can automatically control the permissions for the first document to ensure efficient collaboration through the first document, while ensuring rigor in the business flow and avoiding inappropriate and arbitrary modification of the first document in the business flow.

In some embodiments, the first permission is the read permission and the edit permission, and the second permission is the read permission. With the read permission, the first document can only be read, and with the edit permission, the first document can be edited. In some embodiments, the first permission includes ownership of the first document, and the second permission does not include ownership of the first document. In some embodiments, having ownership of the first document means that the editing operation can for the first document, the first document can be read or edited, and the processing person can process operation items, such as agreeing to process the business item so that the business processing flows to the next business processing node, or opposing the process, thereby ending the business flow.

In some embodiments, after receiving the first document, an owner of the first document is modified to a first application, the first application is used to process the business flow. After the owner is modified to the first application, corresponding permission management or notification may be performed on the first document or information related to its processing flow according to the permission control strategy and notification strategy associated with the first application. In some embodiments, when the first document has entered the first application for approval operations, the owner of the first document is modified to the first application instead of the author of the first document, that is, the author of the first document will not have the edit permission for the first document at this time. In this way, it is possible to prevent the first document from being arbitrarily modified in the business flow. In some embodiments of the present disclosure, the creator of the business flow is the owner of the first document. After entering the business flow, the ownership of the first document is transferred from the creator to the first application, and for the creator, the read permission for the first document but not the edit permission for the first document may be retained. After entering the business flow, the permissions of the processing persons of the non-current business processing nodes of the business flow can all be readable but not editable. Only the current business processing node may have edit permission (whether it has the edit permission or not depend on whether the edit permission has been granted to the processing person of the node in advance); after the business flow is ended, the ownership of the first document is returned to the creator of the business flow.

In some embodiments, after receiving the first document, the associated person of the business node of the business flow has predetermined permissions (e.g., read permission or edit permission) for the first document. In the process of creating the business flow, the permission of the associated person of each business node in the business flow can be set. Once the first document enters the business flow, the associated person of the corresponding business node has the corresponding predetermined permission for the first document. Thus, efficient and unified management of permissions for the first document in the business flow is provided.

In some embodiments, when the first document is not passed through the business flow or returned to the creator of the business flow, the permission of the author for the first document is changed from the second permission to the first permission, such as read permission and edit permission. In some embodiments, the first document is not passed through the business flow or returned to the creator of the business flow due to the unqualified form or substance of the first document. When this happens, the author may want to modify the first document to meet the corresponding requirements. In this way, by changing the permission of the author for the first document from the second permission to the first permission, the business flow can be proceeded in sequence. After the author completes the modification to the first document, the first document that meets the requirements can be submitted for the next business flow.

In some embodiments, when first associated person in the business node of the business flow transfers a processing task to a third person (also referred to as further person), the third person has the same permission for the first document as the first associated person before the transfer. For example, if the first associated person are the transferors and the other person is the transferred person, if the first associated person has an edit permission for the first document, the third person would also have the edit permission for the first document; if the first associated person has a read permission only, the third person also has the read permission. In this way, the permission for task processing in the business flow is handed over or connected in an orderly manner, thereby ensuring rigor in the business flow.

In some embodiments, when second associated person in a business node of a business flow adds a task node to a third person (also referred to as further person), the third person and the second associated person have the same permission for the first document, or a permission of the third person for the first document is a subset of the permission of the second associated person for the first document. For example, if the second associated person has an edit permission for the first document, the third person also has the edit permission for the first document, or the third person may only have the read permission; if the second associated person only has a read permission, the other person may also have read permission. In this way, the permission for task processing in the business flow can be handed over or connected in an orderly manner, thereby ensuring rigor in the business flow.

In some embodiments, when a task node corresponding to a third associated person in the business node of the business flow is deleted, the permission of the third associated person for the first document is revoked. When the task node corresponding to the third associated person is deleted, the third associated person no longer need to process the first document, and the permission of the third associated person for the first document is revoked, which can avoid unnecessary modifications that the third associated person may be made subsequently to the first document, thereby ensuring rigor in the business flow.

In some embodiments, when the business flow proceeds from the current business node to the next business node, the method further comprises at least one of the following: a permission of the associated person of the current business node for the first document is changed from the first permission to the second permission; or the permission of the associated person of the next business node for the first document is changed from the second permission to the first permission; or a permission of an associated person of the current business node for the first document is changed from a third permission to a fourth permission, wherein the third permission is associated with the current business node, and the fourth permission is associated with the next business node. Since the associated person of the current node has finished processing, the permission thereof for the first document is changed from the first permission to the second permission, for example, the edit permission is revoked, which can avoid inappropriate modification by the associated person of the current node in subsequent business flow, and can ensure the rigor in the business flow. In addition, since the business flow enters the next business node, the permission of the associated person of the next business node for the first document is changed from the second permission to the first permission, for example, the edit permission is added, which can also ensure the smooth processing of the associated person of the next business node.

In some embodiments, when the business flow returns from a current business node to a previous business node prior to the current business node, the method further comprises at least one of the following: a permission of associated person of the previous business node for the first document is changed from the second permission to the first permission; or a permission of associated person of the current business node for the first document is changed from the first permission to the second permission; or the permission of an associated person of the current business node for the first document is changed from a third permission to a fifth permission, wherein the third permission is associated with the current business node, and the fifth permission is associated with the previous business node. Since the associated person of the current node has finished the processing and the business flow is returned to the previous business node, the permission of the associated person of the current node for the first document is changed from the first permission to the second permission, for example, the edit permission is revoked, which can avoid inappropriate modifications of the associated person of the current node in subsequent business flows, and thus ensuring the rigor in the business flow. In addition, since the business flow enters and then returns to the previous business node, the permission of the associated person of the previous business node for the first document is changed from the second permission to the first permission, for example, the edit permission is added, which can also ensure the smooth processing of the associated person of the previous business node, such as entering the following business flow in order after editing the first document.

In some embodiments, the carbon copied person and the shared person only have read permission but do not have edit permission. In some embodiments, the newly assigned user will perform operations on the reassigned document to be processed.

In this disclosure, the ability for granting the edit permission for the cloud document is called through the application in an interface mode, which realizes deep integration of the cloud document permission and the application, making the collaboration ability of the cloud document more suitable for the specific business logic of the application and application scenarios. When the business status is switched, for example, when the approval flow status is switched, the edit permission for the cloud document is automatically adjusted, such as revoking the edit permission during approval, regranting the permission after approval is not passed, and revoking the permission and performing automatic archiving after approval, which can reasonably set the permission to avoid damaging business logic or causing information leakage, etc.

The embodiment of the present disclosure further provides an apparatus for information processing 600. The apparatus for information processing 600 includes a document receiving module 601 and a message sending module 602. In some embodiments, the document receiving module 601 is configured to receive a first document for processing a business flow, and the business flow includes one or more business nodes. In some embodiments, the message sending module 602 is configured to determine, when a predetermined operation is performed on a content of the first document, an associated person associated with at least one business node of the business flow based on the predetermined operation, and sending a notification message to the associated person.

It should be understood that the content described about the method of information processing also applies to the apparatus for information processing 600 used here. For simplicity, it will not be described in detail here.

In some embodiments, receiving the first document includes: adding an existing document into an interface of a first application, the first document including the added existing document; or, generating a new document within the interface of the first application, the first document including the generated new document; wherein the first application is configured to process the business flow. In some embodiments, determining the person associated with at least one business node of the business flow includes: determining a predetermined type of business node of the business flow, and determining the associated person of the predetermined type of business node. In some embodiments, the predetermined type of business node includes a business creation node, and the associated person includes a person who created the business flow. In some embodiments, the predetermined operation includes a comment operation, the first document is an online document, and the associated person includes a creator of the business flow. In some embodiments, the determining associated person associated with at least one business node of the business flow based on the predetermined operation and sending a notification message to the associated person includes: when no person is mentioned in content of the predetermined operation, sending a notification message to a person who created the business flow and/or a person who will perform a business operation on the first document during the business flow. In some embodiments, the determining an associated person associated with at least one business node of the business flow based on the predetermined operation and sending a notification message to the associated person includes: when a person is mentioned in content of the predetermined operation, sending a notification message to a creator of the business flow and the mentioned person. In some embodiments, the determining an associated person associated with at least one business node of the business flow based on the predetermined operation and sending a notification message to the associated person includes: when content of the predetermined operation is associated with a specific person and the specific person does not have a read permission for the first document, sending a reminder message to remind whether to grant the read permission for the first document to the specific person. In some embodiments, the sending a notification message to the associated person includes: sending a notification message to the associated person in a predetermined communication software, and when a preset control in the notification message is triggered, jumping to a business node corresponding to the associated person in the business flow for corresponding processing. In some embodiments, the predetermined operation includes a modification operation for content of the first document, and the associated person comprises a relevant person of a business node that has performed a business processing operation based on the first document prior to the modification operation. In some embodiments, based on the notification message, business processing opinions for the first document are modifiable by the associated person of the corresponding business node. In some embodiments, the notification message is configured to notify that the predetermined operation is performed on the content of the first document. The notification message includes at least one of the following: at least one of the following: a type of the predetermined operation, a mentioned person, a creator of the business flow, content of the predetermined operation, content modification of the first document, a business flow identification or an identification of the first document, and business flow summary information. In some embodiments, an author of the first document has a first permission for the first document before receiving the first document; after receiving the first document, the author's permission for the first document is changed to a second permission, which is different from the first permission. In some embodiments, the first permission includes a read permission and an edit permission, and the second permission is a read permission; or, the first permission includes ownership of the first document, and the second permission does not include ownership of the first document. In some embodiments, after receiving the first document, after receiving the first document, an owner of the first document is modified to a first application, the first application is used to process the business flow. In some embodiments, after receiving the first document, an associated person of the business node of the business flow has a predetermined permission for the first document. In some embodiments, when the first document is not passed through the business flow or returned to a creator of business data of the business flow, the permission of the author for the first document is changed from the second permission to the first permission. In some embodiments, when a first associated person in a business node of the business flow transfers a processing task to a third person, a permission of the third person for the first document is the same as that of the first associated person for the first document before the transfer. In some embodiments, when a second associated person in a business node of the business flow adds a business node to a third person, the third person and the second associated person have the same permission for the first document, or a permission of the third person for the first document is a subset of a permission of the second associated person for the first document. In some embodiments, when a task node corresponding to a third associated person in the business node of the business flow is deleted, a permission of the third associated person for the first document is revoked. In some embodiments, when the business flow proceeds from a current business node to a next business node, the method further comprises at least one of the following: a permission of an associated person of the current business node for the first document is changed from the first permission to the second permission; or a permission of an associated person of the next business node for the first document is changed from the second permission to the first permission; or the permission of an associated person of the current business node for the first document is changed from a third permission to a fourth permission, wherein the third permission is associated with the current business node, and the fourth permission is associated with the next business node. In some embodiments, when the business flow returns from a current business node to a previous business node prior to the current business node, the method further comprises at least one of the following: a permission of an associated person of the previous business node for the first document is changed from the second permission to the first permission; or a permission of an associated person of the current business node for the first document is changed from the first permission to the second permission; or the permission of an associated person of the current business node for the first document is changed from a third permission to a fifth permission, wherein the third permission is associated with the current business node, and the fifth permission is associated with the previous business node.

Further, the present disclosure also provides a terminal, which includes: at least one memory and at least one processor; where the memory is configured to store program code, and the processor is configured to call the program code stored in the memory to perform the method of information processing as described above.

In addition, the present disclosure also provides a computer storage medium, which stores program code, and the program code is configured to execute the method of information processing as described above.

Above, the method and apparatus for information processing is described based on embodiments and application examples. In addition, the present disclosure also provides a terminal and a storage medium, and the description of the terminals and storage medium is provided as follows.

Figure 21:
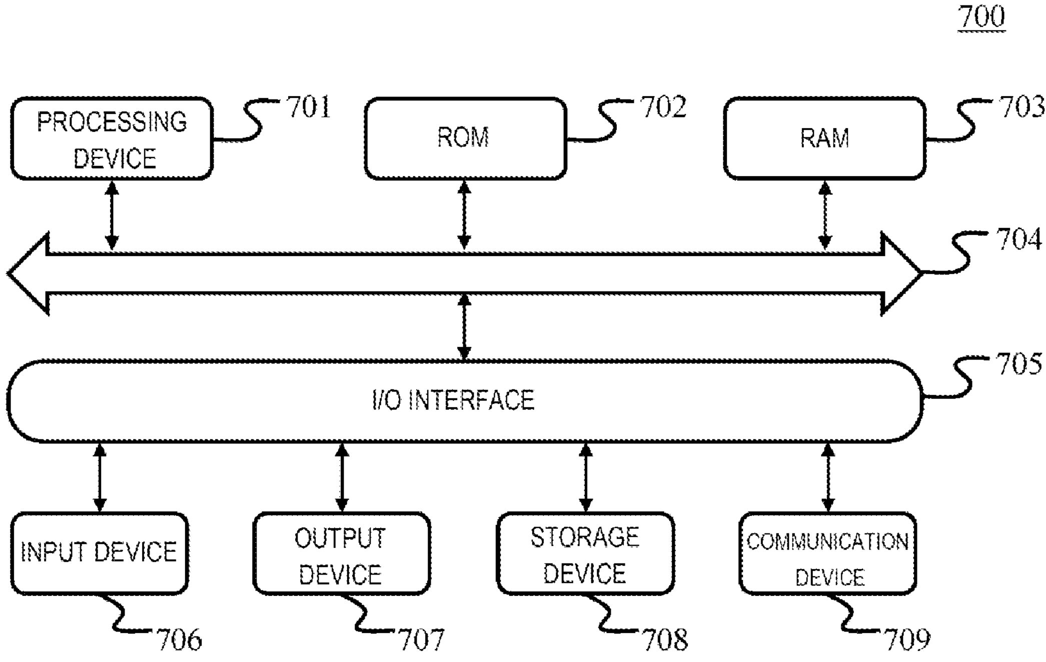
FIG. 21 is a schematic structural diagram of an electronic device according to embodiments of the present disclosure.

Referring now to FIG. 21, it is a structural schematic diagram of an electronic device (such as the terminal device or server) suitable for implementing the embodiment of the present disclosure. The terminal device 700 in the embodiment of the present disclosure may include but is not limited to mobile terminals such as mobile phones, laptops, digital broadcast receivers, PDAs (Personal Digital Assistants), PADs (tablet computers), PMPs (portable multimedia players), car-mounted terminals (such as car navigation terminals), etc. and fixed terminals such as digital televisions (TV), desktop computers, etc. The electronic device shown in FIG. 21 is only an example and should not bring any limitation on the functionality and scope of use of the embodiment of the present disclosure.

As shown in FIG. 21, the electronic device 700 may include a processing device (such as a central processing unit, graphics processing unit, etc.) 701, which may perform various appropriate actions and processes based on programs stored in Read-Only Memory (ROM) 702 or loaded from storage device 708 into Random Access Memory (RAM) 703. In the RAM 703, various programs and data necessary for the operation of the electronic device 700 are also stored. The processing device 701, ROM 702, and RAM 703 are connected to each other through a bus 704. An Input/Output I/O interface 705 is also connected to the bus 704.

Typically, the following apparatuses can be connected to I/O interface 705: input device 706 including, for example, touch screens, touchpads, keyboards, mice, cameras, microphones, accelerometers, gyroscopes, etc.; output device 707 including liquid crystal displays (LCDs), speakers, vibrators, etc.; storage device 708 including magnetic tapes, hard disks, etc.; and a communication device 709. The communication device 709 may allow the electronic device 700 to communicate with other apparatuses wirelessly or wirelessly to exchange data. Although FIG. 21 shows an electronic device 700 with a plurality of apparatuses, it shall be understood that it is not required to implement or have all of the apparatuses shown. More or fewer apparatuses can be implemented or provided instead.

In particular, according to embodiments of the present disclosure, the process described above with reference to the flowchart can be implemented as a computer software program. For example, an embodiment of the present disclosure includes a computer program product that includes a computer program carried on a computer-readable medium, where the computer program includes program code for performing the method shown in the flowchart. In such an embodiment, the computer program can be downloaded and installed from a network through the communication device 709, or installed from the storage device 708, or installed from the ROM 702. When the computer program is executed by the processing device 701, the above functions defined in the method of the embodiment of the present disclosure are performed.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, including but not limited to: wires, optical cables, RF (radio frequency), etc., or any suitable combination thereof.

In some embodiments, clients and servers can communicate using any currently known or future developed network protocol such as HTTP (HyperText Transfer Protocol), and can be interconnected with any form or medium of digital data communication (such as communication networks). Examples of communication networks include local area networks ("LANs"), wide area networks ("WANs"), internetworks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device perform the above method of the present disclosure.

Computer program codes for performing the operations of the present disclosure may be written in one or more programming languages or a combination thereof, including Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case.

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, there is provided a method of information processing, the method of information processing includes: receiving a first document for processing a business flow, where, the business flow comprises one or more business nodes; and when a predetermined operation is performed on a content of the first document, determining an associated person associated with at least one business node of the business flow based on the predetermined operation, and sending a notification message to the associated person.

According to one or more embodiments of the present disclosure, the receiving a first document includes: adding an existing document into an interface of a first application, the first document including the added existing document; or, generating a new document within the interface of the first application, the first document including the generated new document; wherein the first application is configured to process the business flow.

According to one or more embodiments of the present disclosure, the determining an associated person associated with at least one business node of the business flow includes: determining a predetermined type of business node of the business flow, and determining the associated person of the predetermined type of business node.

According to one or more embodiments of the present disclosure, the determining an associated person associated with at least one business node of the business flow includes: determining a predetermined type of business node of the business flow, and determining the associated person of the predetermined type of business node; the predetermined type of business node includes a business creation node, and the associated person includes a person who created the business flow.

According to one or more embodiments of the present disclosure, the predetermined operation includes a comment operation, the first document is an online document, and the associated person includes a creator of the business flow.

According to one or more embodiments of the present disclosure, the determining an associated person associated with at least one business node of the business flow based on the predetermined operation and sending a notification message to the associated person includes: when no person is mentioned in content of the predetermined operation, sending a notification message to a person who created the business flow and/or a person who will perform a business operation on the first document during the business flow.

According to one or more embodiments of the present disclosure, the determining an associated person associated with at least one business node of the business flow based on the predetermined operation and sending a notification message to the associated person includes: when a person is mentioned in content of the predetermined operation, sending a notification message to a creator of the business flow and the mentioned person.

According to one or more embodiments of the present disclosure, the determining an associated person associated with at least one business node of the business flow based on the predetermined operation and sending a notification message to the associated person includes: when content of the predetermined operation is associated with a specific person and the specific person does not have a read permission for the first document, sending a reminder message to remind whether to grant the read permission for the first document to the specific person.

According to one or more embodiments of the present disclosure, the sending a notification message to the associated person includes: sending a notification message to the associated person in a predetermined communication software, and when a preset control in the notification message is triggered, jumping to a business node corresponding to the associated person in the business flow for corresponding processing.

According to one or more embodiments of the present disclosure, the predetermined operation includes a modification operation for content of the first document, the associated person includes a relevant person of a business node that has performed a business processing operation based on the first document before the modification operation.

According to one or more embodiments of the present disclosure, the predetermined operation includes a modification operation for content of the first document, the associated person includes a relevant person of a business node that has performed a business processing operation based on the first document before the modification operation; based on the notification message, business processing opinions for the first document are modifiable by the associated person of the corresponding business node.

According to one or more embodiments of the present disclosure, the notification message is configured to notify that the predetermined operation is performed on the content of the first document, and the notification message includes at least one of the following: a type of the predetermined operation, a mentioned person, a creator of the business flow, content of the predetermined operation, content modification of the first document, a business flow identification or an identification of the first document, and business flow summary information.

According to one or more embodiments of the present disclosure, before receiving the first document, an author of the first document has a first permission for the first document; after receiving the first document, a permission of the author for the first document is changed to a second permission, the second permission being different from the first permission.

According to one or more embodiments of the present disclosure, before receiving the first document, an author of the first document has a first permission for the first document; after receiving the first document, a permission of the author for the first document is changed to a second permission, the second permission being different from the first permission, the first permission includes a read permission and an edit permission, and the second permission is a read permission; or, the first permission includes ownership of the first document, and the second permission does not include ownership of the first document.

According to one or more embodiments of the present disclosure, after receiving the first document, an owner of the first document is modified to a first application, the first application is configured to process the business flow.

According to one or more embodiments of the present disclosure, after receiving the first document, the associated person of the business node of the business flow has a predetermined permission for the first document.

According to one or more embodiments of the present disclosure, before receiving the first document, an author of the first document has a first permission for the first document; after receiving the first document, a permission of the author for the first document is changed to a second permission, the second permission being different from the first permission; and when the first document is not passed through the business flow or returned to a creator of business data of the business flow, the permission of the author for the first document is changed from the second permission to the first permission.

According to one or more embodiments of the present disclosure, when a first associated person in a business node of the business flow transfers a processing task to a third person, a permission of the third person for the first document is the same as that of the first associated person for the first document before the transfer.

According to one or more embodiments of the present disclosure, when a second associated person in a business node of the business flow adds a business node to a third person, the third person and the second associated person have the same permission for the first document, or a permission of the third person for the first document is a subset of a permission of the second associated person for the first document.

According to one or more embodiments of the present disclosure, when a task node corresponding to a third associated person in the business node of the business flow is deleted, a permission of the third associated person for the first document is revoked.

According to one or more embodiments of the present disclosure, before receiving the first document, an author of the first document has a first permission for the first document; after receiving the first document, a permission of the author for the first document is changed to a second permission, the second permission being different from the first permission. When the business flow proceeds from the current business node to the next business node, a permission of the associated person of the current business node for the first document is changed from the first permission to the second permission, and a permission of associated person of the next business node for the first document is changed from the second permission to the first permission.

According to one or more embodiments of the present disclosure, before receiving the first document, an author of the first document has a first permission for the first document; after receiving the first document, a permission of the author for the first document is changed to a second permission, the second permission being different from the first permission. When the business flow returns from the current business node to the business node prior to the current business node, a permission of the associated person of the previous business node for the first document is changed from the second permission to the first permission, and a permission of the associated person of the current business node for the first document is changed from the first permission to the second permission.

According to one or more embodiments of the present disclosure, there is provided an apparatus for information processing, the apparatus for information processing includes: a document receiving module configured to receive a first document for processing a business flow, wherein the business flow includes one or more business nodes; and a message sending module configured to determine, when a predetermined operation is performed on a content of the first document, an associated person associated with at least one business node of the business flow based on the predetermined operation, and sending a notification message to the associated person.

According to one or more embodiments of the present disclosure, there is provided a terminal, including: at least one memory and at least one processor; where the at least one memory is configured to store program code, and the at least one processor is configured to call the program code stored in the at least one memory to perform the method according to any one of the above methods.

According to one or more embodiments of the present disclosure, there is provided a storage medium for storing program code, the program code is configured to perform the method described above.

According to one or more embodiments of the present disclosure, there is provided a method of information processing, the method includes:

in response to a first operation event, creating a first processing item, the first processing item includes a first online document therein;

in response to the second operation event, triggering a processing flow of the first processing item.

According to one or more embodiments of the present disclosure, there is provided a method of information processing, before creating a first processing item in response to a first operation event, the method further includes: in response to a process creation operation, setting a business processing node of the processing flow and document permission of a processing person of the business processing node.

According to one or more embodiments of the present disclosure, there is provided a method of information processing, before creating a first processing item in response to a first operation event, the method further includes: creating an item template for the processing item, where a control for adding an online document is included in the item template;

The first processing item is established based on the item template.

According to one or more embodiments of the present disclosure, there is provided a method of information processing, the method further includes:

displaying the first processing item in a control of a target communication software of a processing person of a node of the processing flow.

According to one or more embodiments of the present disclosure, there is provided a method of information processing, a document display area for displaying the first online document is included in a display interface of the first processing item, the document display area, the size and/or position of the document display area is adjustable.

According to one or more embodiments of the present disclosure, there is provided a method of information processing, the creator of the first processing item is the owner of the first online document, and after triggering the processing flow of the first processing item, ownership of the first online document is transferred from the creator of the first processing item to the first application; after the processing flow of the first processing item is completed, ownership of the first online document is returned to the creator of the first processing item.

According to one or more embodiments of the present disclosure, there is provided a method of information processing, where, during execution of the processing flow, the edit permission for the first online document is only granted to a processing person with editing permission in a current business processing node of the processing flow;

The document permission assigned to the processing person of the business processing node is revoked after the processing flow is completed.

According to one or more embodiments of the present disclosure, there is a method of information processing, the method of information processing includes: receiving a first document for a processing flow, where, before receiving the first document, an author of the first document has a first permission for the first document; after receiving the first document, a permission of the author for the first document is changed to a second permission, the second permission being different from the first permission.

According to one or more embodiments of the present disclosure, the first permission includes a read permission and edit permission, the second permission is a read permission.

According to one or more embodiments of the present disclosure, after receiving the first document, a processing person in the node of the business flow has a predetermined permission for the first document.

According to one or more embodiments of the present disclosure, when the first document is not passed through the business flow or returned to an initiator of the business flow, the permission of the author for the first document is changed from the second permission to the first permission.

According to one or more embodiments of the present disclosure, when a first processing person in a node of the business flow transfers a processing task to a third person, a permission of the third person for the first document is the same as that of the first processing person for the first document before the transfer.

According to one or more embodiments of the present disclosure, when a first processing person in a node of the business flow adds a task node to third person, the permissions of the third person and the first processing person for the first document are the same.

According to one or more embodiments of the present disclosure, when a task node corresponding to the first processing person in a node of the processing flow is deleted, the permission of the first processing person for the first document is revoked.

According to one or more embodiments of the present disclosure, when the processing flow proceeds from a current node to a next node, a permission of the first processing person of the current node for the first document is changed from the first permission to the second permission, and a permission of a second processing person of the next node for the first document is changed from the second permission to the first permission.

According to one or more embodiments of the present disclosure, when the processing flow is returned from the current node to a previous node, a permission of the first processing person of the previous node for the first document is changed from the second permission to the first permission, and a permission of the second processing person of the current node for the first document is changed from the first permission to the second permission.

According to one or more embodiments of the present disclosure, the method further includes: receiving comment content in a comment area of the first document, and when in the comment content, the comment content is not associated with any person, sending a notification message to the initiator and processing person of the processing flow.

According to one or more embodiments of the present disclosure, the method further includes: receiving comment content in a comment area of the first document, and when in the comment content, the comment content is associated with a processing person of the processing flow, sending a notification message to the initiator of the processing flow and the processing person associated with the comment content.

According to one or more embodiments of the present disclosure, the method further includes: receiving comment content in a comment area of the first document, and in the comment content, the comment content is associated with a specific person, and when the specific person does not have a permission for the first document, a reminder message is sent to remind whether to grant the read permission for the first document to the specific person.

According to one or more embodiments of the present disclosure, when determining to grant a reading permission for the first document to the specific person, a notification message is sent to the specific person.

According to one or more embodiments of the present disclosure, there is provided an apparatus for information processing, and the apparatus for information processing includes: a document receiving module configured to receive a first document for a processing flow, wherein before receiving the first document, author of the first document has a first permission for the first document; and a permission changing module configured to change, after receiving the first document, a permission of the author for the first document to a second permission, the second permission is different from the first permission.

According to one or more embodiments of the present disclosure, there is provided a method of information processing, including:

before a predetermined processing node corresponding to a processing request for the first file, determining a target save address of the first file in response to a user operation, so that the first file is saved to the target save address after processing of the processing request is completed.

According to one or more embodiments of the present disclosure, there is provided a method of information processing, including:

before the predetermined node, determining a target save address of the first file in response to a user operation; and sending the processing request for the first file so that the processing request is processed;

the target save address is the save address of the first file after the processing request is processed.

According to one or more embodiments of the present disclosure, the processing request includes address information of the target save address.

According to one or more embodiments of the present disclosure, if the first file is a document, the method of information processing further includes: after the processing request is processed, displaying processing information corresponding to the processing request at a predetermined position within the document.

According to one or more embodiments of the present disclosure, the processing information includes link information, the link information is configured to display processing detail information in response to a user operation.

According to one or more embodiments of the present disclosure, the processing detail information includes at least one of the following information: processing node information, processing person information, processing opinion information, and processing time information.

According to one or more embodiments of the present disclosure, the method of information processing further includes: storing a file save directory in advance; and the determining a target save address of the first file in response to a user operation includes: in response to a user operation for the file save directory, determining the target save address of the first file.

According to one or more embodiments of the present disclosure, there is provided a method of information processing, including:

a determining unit configured to determine a target save address of the first file in response to a user operation, before any node corresponding to a processing request for the first file, so that the first file is saved to the target save address after the processing of the processing request is completed.

According to one or more embodiments of the present disclosure, there is provided an apparatus for information processing including:

a save address determining unit configured to determine a target save address of the first file in response to a user operation before a predetermined node;

a request sending unit configured to send a processing request for the first file so that the processing request is processed;

the target save address is the save address of the first file after the processing request is processed.

According to one or more embodiments of the present disclosure, if the first file is a document, the apparatus for information processing further includes: a processing information display unit configured to display processing information corresponding to the processing request at a predetermined position within the document after the processing request is processed.

According to one or more embodiments of the present disclosure, the apparatus for information processing includes: a directory storing unit for storing a file save directory in advance; and the determining the target save address of the first file in response to a user operation includes: in response to a user operation of the file save directory, determining the target save address of the first file.

According to one or more embodiments of the present disclosure, there is provided an electronic device comprising:

at least one memory and at least one processor;

the memory is configured for storing program code, the processor is configured to call the program code stored in the memory, so that the electronic device performs a method of providing information processing according to one or more embodiments of the present disclosure.

The above description is only embodiments of this disclosure and an explanation of the technical principles used. Those skilled in the art should understand that the scope of the disclosure involved in this disclosure is not limited to technical solutions composed of specific combinations of the above technical features, but should also covers other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although a plurality of operations are depicted in a specific order, this should not be understood as requiring these operations to be performed in the specific order shown or in a sequential order. In certain environments, multitasking and parallel processing may be advantageous. Similarly, although a plurality of implementation details are included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely example forms of implementing the claims.

We claim:

1. A method of information processing comprising:

receiving a first document for processing a business flow, the business flow comprising one or more business nodes;

linking or displaying the first document in a processing interface of a first application; and when a predetermined operation is performed on a content of the first document, determining an associated person associated with at least one business node of the business flow based on the predetermined operation, and sending a notification message to the associated person, wherein the sending the notification message to the associated person comprises:

sending the notification message to the associated person in a predetermined communication application, the predetermined communication application being different from the first application for processing the business flow, the predetermined communication application being associated with the first application, and an interface on the predetermined communication application for displaying the notification message comprising a preset control;

wherein the method further comprises:

when the preset control in the notification message is triggered by the associated person, presenting, in the predetermined application, a display interface of the business flow, the display interface comprising the first document and a business node corresponding to the associated person in the business flow for corresponding processing about the first document in the predetermined communication application;

receiving, in the display interface that is presented in the predetermining communication application operations performed by the associated person about the business flow and the first document; and synchronizing, from the predetermined communication application and to the first application, a result of the operations about the business flow and the first document.

2. The method of information processing of claim 1, wherein the receiving the first document comprises:

adding an existing document into an interface of the first application, the first document comprising the added existing document, or generating a new document within the interface of the first application, the first document comprising the generated new document.

3. The method of information processing of claim 1, wherein the determining the associated person associated with at least one business node of the business flow comprises:

determining a predetermined type of business node of the business flow, and determining the associated person of the predetermined type of business node, wherein the predetermined type of business node comprises a business creation node, and the associated person comprises a person who created the business flow.

4. The method of information processing of claim 1, wherein the predetermined operation comprises a comment operation, the first document is an online document, and the associated person comprises a creator of the business flow.

5. The method of information processing of claim 1, wherein the determining the associated person associated with at least one business node of the business flow based on the predetermined operation and sending the notification message to the associated person comprises:

when no person is mentioned in content of the predetermined operation, sending a notification message to a person who created the business flow and/or a person who will perform a business operation on the first document during the business flow.

6. The method of information processing of claim 1, wherein the determining the associated person associated with at least one business node of the business flow based on the predetermined operation and sending the notification message to the associated person comprises:

when a person is mentioned in content of the predetermined operation, sending a notification message to a creator of the business flow and the mentioned person.

7. The method of information processing of claim 1, wherein the determining the associated person associated with at least one business node of the business flow based on the predetermined operation and sending the notification message to the associated person comprises:

when content of the predetermined operation is associated with a specific person and the specific person does not have a read permission for the first document, sending a reminder message to remind whether to grant the read permission for the first document to the specific person.

8. The method of information processing of claim 1, wherein the predetermined operation comprises a modification operation for content of the first document, and the associated person comprise a relevant person of a business node that has performed a business processing operation based on the first document before the modification operation.

9. The method of information processing of claim 8, wherein, based on the notification message, business processing opinions for the first document are modifiable by the associated person of the corresponding business node.

10. The method of information processing of claim 1, wherein the notification message is configured to notify that the predetermined operation is performed on the content of the first document, and the notification message comprises at least one of the following: a type of the predetermined operation, a mentioned person, a creator of the business flow, content of the predetermined operation, content modification of the first document, a business flow identification or an identification of the first document, and business flow summary information.

11. The method of information processing of claim 1, wherein before receiving the first document, an author of the first document has a first permission for the first document; and after receiving the first document, the permission of the author for the first document is changed to a second permission, the second permission being different from the first permission.

12. The method of information processing of claim 11, wherein the first permission comprises a read permission and an edit permission, and the second permission is a read permission.

13. The method of information processing of claim 11, wherein when the first document is not passed through the business flow or returned to a creator of business data of the business flow, the permission of the author for the first document is changed from the second permission to the first permission.

14. The method of information processing of claim 11, wherein when the business flow proceeds from a current business node to a next business node, the method further comprises at least one of the following:

a permission of an associated person of the current business node for the first document is changed from the first permission to the second permission, or a permission of an associated person of the next business node for the first document is changed from the second permission to the first permission, or the permission of an associated person of the current business node for the first document is changed from a third permission to a fourth permission, wherein the third permission is associated with the current business node, and the fourth permission is associated with the next business node.

15. The method of information processing of claim 11, wherein when the business flow returns from a current business node to a previous business node prior to the current business node, the method further comprises at least one of the following:

a permission of an associated person of the previous business node for the first document is changed from the second permission to the first permission, or a permission of an associated person of the current business node for the first document is changed from the first permission to the second permission, or the permission of an associated person of the current business node for the first document is changed from a third permission to a fifth permission, wherein the third permission is associated with the current business node, and the fifth permission is associated with the previous business node.

16. The method of information processing of claim 11, wherein the first permission comprises ownership of the first document, and the second permission does not comprise ownership of the first document.

17. The method of information processing of claim 1, wherein after receiving the first document, an owner of the first document is modified to a first application, the first application is configured to process the business flow.

18. The method of information processing of claim 1, wherein after receiving the first document, the associated person of the business node of the business flow has a predetermined permission for the first document.

19. The method of information processing of claim 1, wherein when a first associated person in a business node of the business flow transfers a processing task to a third person, a permission of the third person for the first document is the same as that of the first associated person for the first document before the transfer.

20. The method of information processing of claim 1, wherein when a second associated person in a business node of the business flow adds a business node to a third person, the third person and the second associated person have a same permission for the first document, or a permission of the third person for the first document is a subset of a permission of the second associated person for the first document.

21. The method of information processing of claim 1, wherein when a task node corresponding to a third associated person in the business node of the business flow is deleted, a permission of the third associated person for the first document is revoked.

22. A terminal comprising:

at least one memory and at least one processor;

wherein the at least one memory is configured to store program code, and the at least one processor is configured to call the program code stored in the at least one memory to perform acts comprising:

receiving a first document for processing a business flow, the business flow comprising one or more business nodes;

linking or displaying the first document in a processing interface of a first application; and when a predetermined operation is performed on a content of the first document, determining an associated person associated with at least one business node of the business flow based on the predetermined operation, and sending a notification message to the associated person, wherein the sending the notification message to the associated person comprises:

sending the notification message to the associated person in a predetermined communication application, the predetermined communication application being different from the first application for processing the business flow, the predetermined communication application being associated with the first application, and an interface on the predetermined communication application for displaying the notification message comprising a preset control;

when the preset control in the notification message is triggered by the associated person, presenting, in the predetermined application, a display interface of the business flow, the display interface comprising the first document and a business node corresponding to the associated person in the business flow for corresponding processing about the first document in the predetermined communication application;

further comprising, receiving, in the display interface that is presented in the predetermining communication application, operations performed by the associated person about the business flow and the first document; and synchronizing, from the predetermined communication application and to the first application, a result of the operations about the business flow and the first document.

23. A non-transitory storage medium for storing program code, wherein the program code is configured to perform acts comprising:

receiving a first document for processing a business flow, the business flow comprising one or more business nodes;

linking or displaying the first document in a processing interface of a first application; and when a predetermined operation is performed on a content of the first document, determining an associated person associated with at least one business node of the business flow based on the predetermined operation, and sending a notification message to the associated person, wherein the sending the notification message to the associated person comprises:

sending the notification message to the associated person in a predetermined communication application, the predetermined communication application being different from a first application for processing the business flow, the predetermined communication application being associated with the first application, and an interface on the predetermined communication application for displaying the notification message comprising a preset control;

when the preset control in the notification message is triggered by the associated person, presenting, in the predetermined application, a display interface of the business flow, the display interface comprising the first document and a business node corresponding to the associated person in the business flow for corresponding processing about the first document in the predetermined communication application;

further comprising, receiving, in the display interface that is presented in the predetermining communication application, operations performed by the associated person about the business flow and the first document; and synchronizing, from the predetermined communication application and to the first application, a result of the operations about the business flow and the first document.

* * * * *